(12) United States Patent
Yavagal et al.

(10) Patent No.: US 10,909,382 B2
(45) Date of Patent: *Feb. 2, 2021

(54) VIDEO RULE ENGINE

(71) Applicant: Amazon Technologies, Inc., Seattle, WA (US)

(72) Inventors: Deepak Suresh Yavagal, Issaquah, WA (US); Matthew Alan Townsend, Redwood City, CA (US); Robert James Hanson, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,975

(22) Filed: Jan. 30, 2020

(65) Prior Publication Data

US 2020/0242369 A1 Jul. 30, 2020

Related U.S. Application Data

(63) Continuation of application No. 14/976,037, filed on Dec. 21, 2015, now Pat. No. 10,592,750.

(51) Int. Cl.
| | |
|---|---|
| *G11B 27/02* | (2006.01) |
| *G06K 9/00* | (2006.01) |
| *H04N 5/232* | (2006.01) |

(52) U.S. Cl.
CPC .......... *G06K 9/00751* (2013.01); *G11B 27/02* (2013.01); *H04N 5/23238* (2013.01)

(58) Field of Classification Search
None
See application file for complete search history.

(56) References Cited

U.S. PATENT DOCUMENTS

| | | | | |
|---|---|---|---|---|
| 10,592,750 | B1* | 3/2020 | Yavagal | G06K 9/00718 |
| 2008/0019610 | A1* | 1/2008 | Matsuzaka | G11B 27/034 |
| | | | | 382/284 |
| 2010/0005485 | A1* | 1/2010 | Tian | G06F 16/786 |
| | | | | 725/32 |
| 2015/0375117 | A1* | 12/2015 | Thompson | H04N 21/254 |
| | | | | 463/9 |

* cited by examiner

*Primary Examiner* — Eileen M Adams
(74) *Attorney, Agent, or Firm* — Pierce Atwood LLP

(57) ABSTRACT

A system and method is provided for using rules to perform a set of actions on video data when conditions are satisfied by the video data. The system receives rules to select a theme, portions of the video data and/or a type of output. For example, based on annotation data associated with the video data, the system may apply rules to select one or more themes, with each of theme associated with a portion of the video data. In some examples, the system may apply rules to determine the portion of the video data associated with the theme. The system may apply rules to generate various types of output data associated with each of the selected themes, the types of output data may include a video summarization, individual video clips, individual video frames, a photo album including video frames selected from the video data or the like.

20 Claims, 27 Drawing Sheets

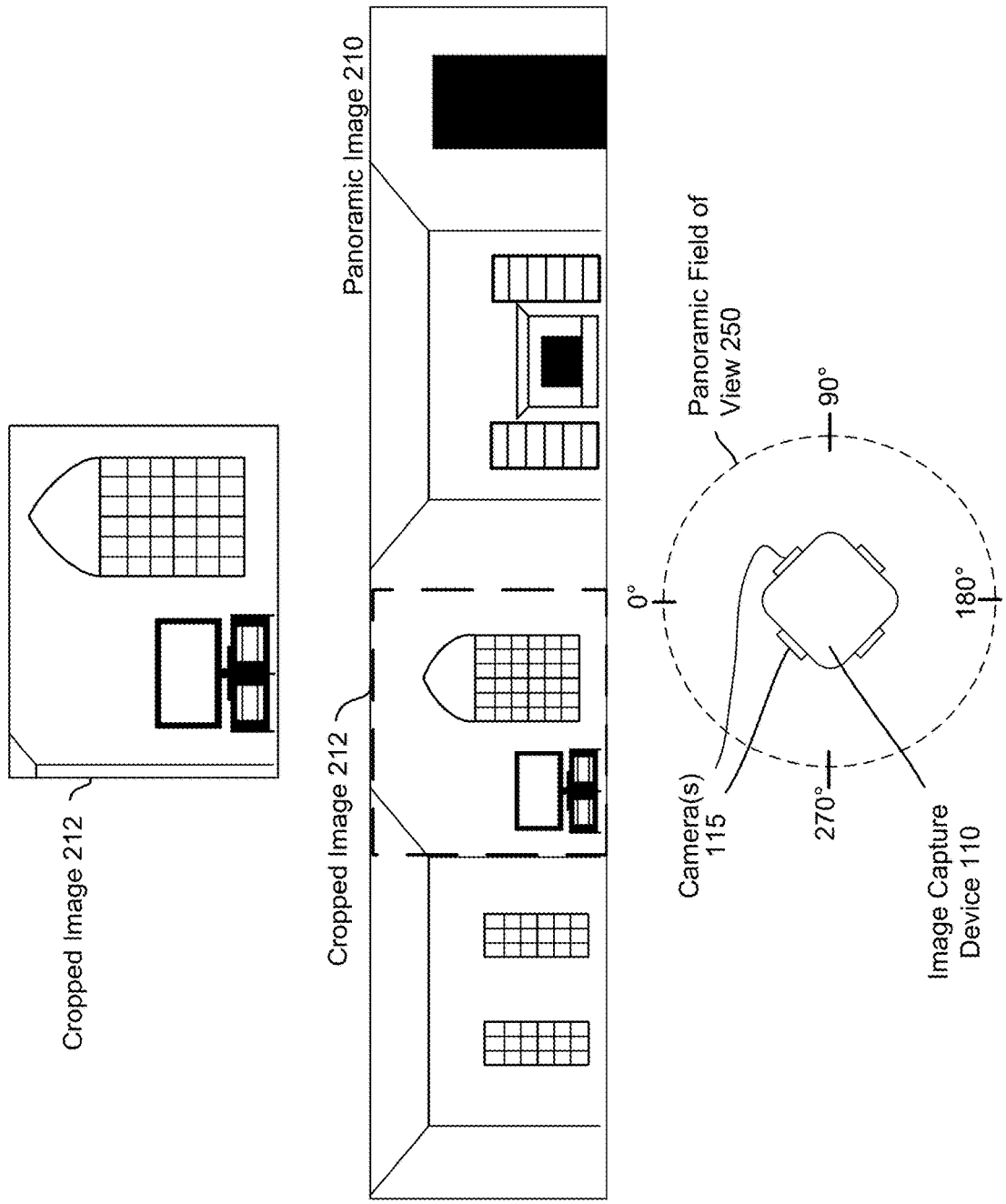

FIG. 5A

| Frame | Time, Location, Motion, Faces, Humans, Scenes, Audio, Landmarks, Objects, Pets, Directional Data, etc. |
|---|---|
| Frame 1 | |
| Frame 2 | |
| Frame 3 | |
| Frame 10 | |
| Frame 11 | |
| Frame 30 | |
| Frame 35 | |

Annotation Database 510

FIG. 5C

| Frame | Priority Metric | Time, Location, Motion, Faces, Humans, Scenes, Audio, Landmarks, Objects, Pets, Directional Data, etc. |
|---|---|---|
| Frames 1-200 | | |
| Frames 350-600 | | |
| Frames 800-1200 | | |
| Frames 1500-1650 | | |
| Frames 2000-2200 | | |
| Frames 2400-2550 | | |
| Summary Data | | |

Annotation Database 514

FIG. 5D

| Clip | Frames Included | Priority Metric | Summary Data | Time/Position of interesting moments |
|---|---|---|---|---|
| Clip 1 | | | | |
| Clip 2 | | | | |
| Clip 3 | | | | |
| Clip 4 | | | | |
| Clip 5 | | | | |
| Clip 6 | | | | |
| Clip 7 | | | | |

Master Clip Table (MCT) 520

FIG. 5E

| Clip | Capture Date | Frames Included | Priority Metric | Summary Data | Time/Position of interesting moments |
|---|---|---|---|---|---|
| Clip 1 | 9/15/2015 | | | | |
| Clip 2 | 9/15/2015 | | | | |
| Clip 3 | 9/15/2015 | | | | |
| Clip 4 | 9/15/2015 | | | | |
| Clip 50 | 9/24/2015 | | | | |
| Clip 51 | 9/24/2015 | | | | |
| Clip 52 | 9/24/2015 | | | | |

Master Clip Table (MCT) 522

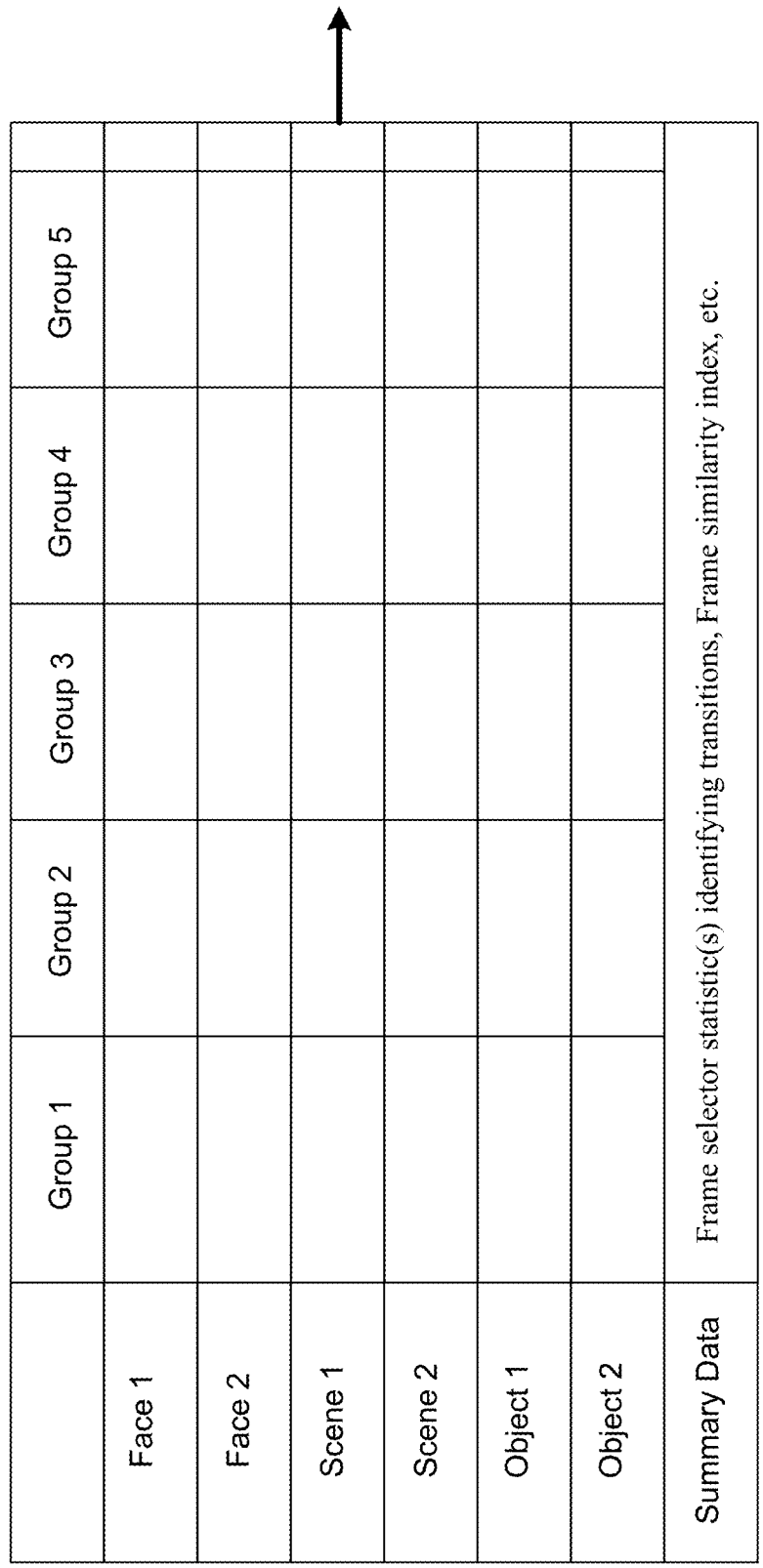

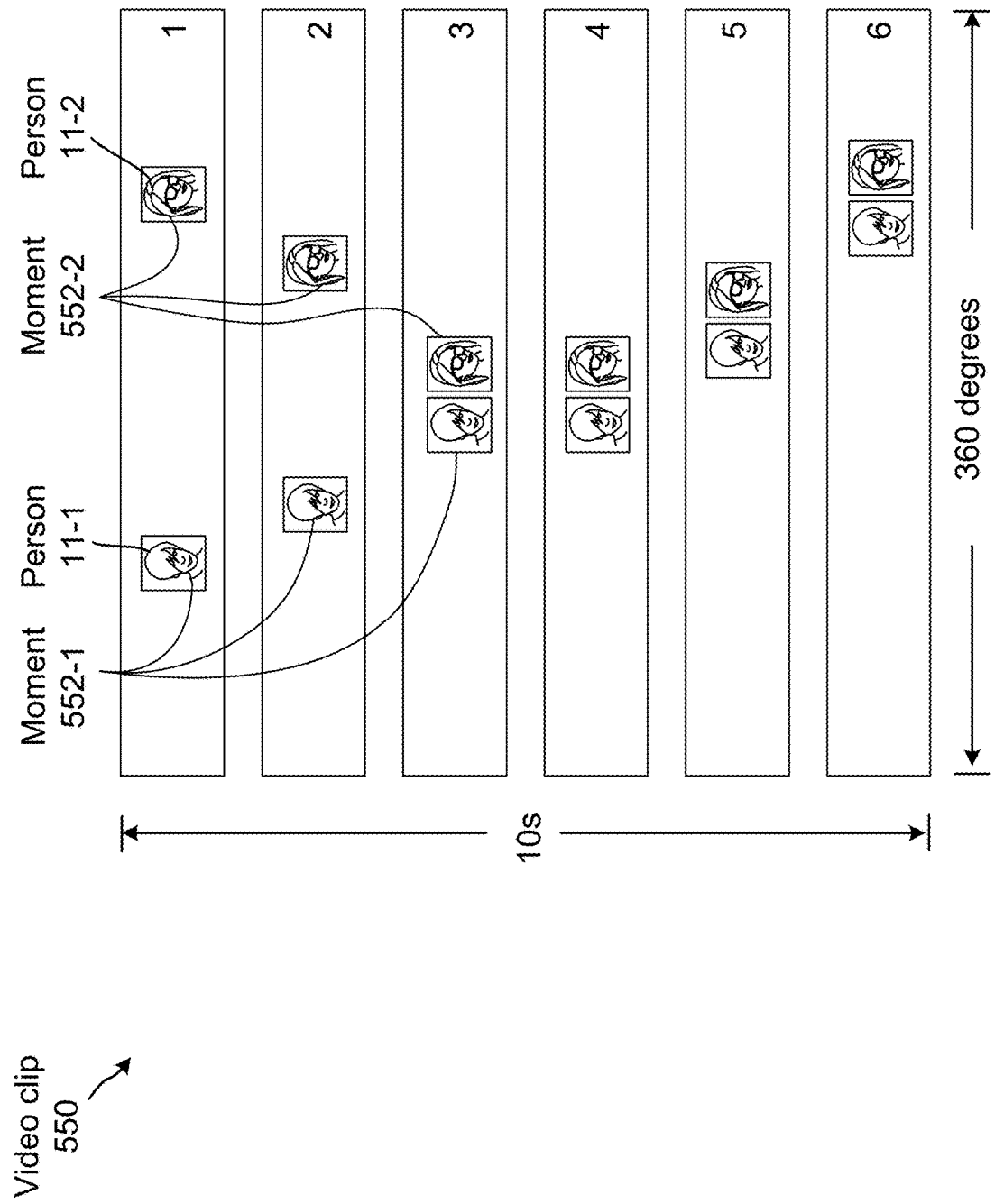

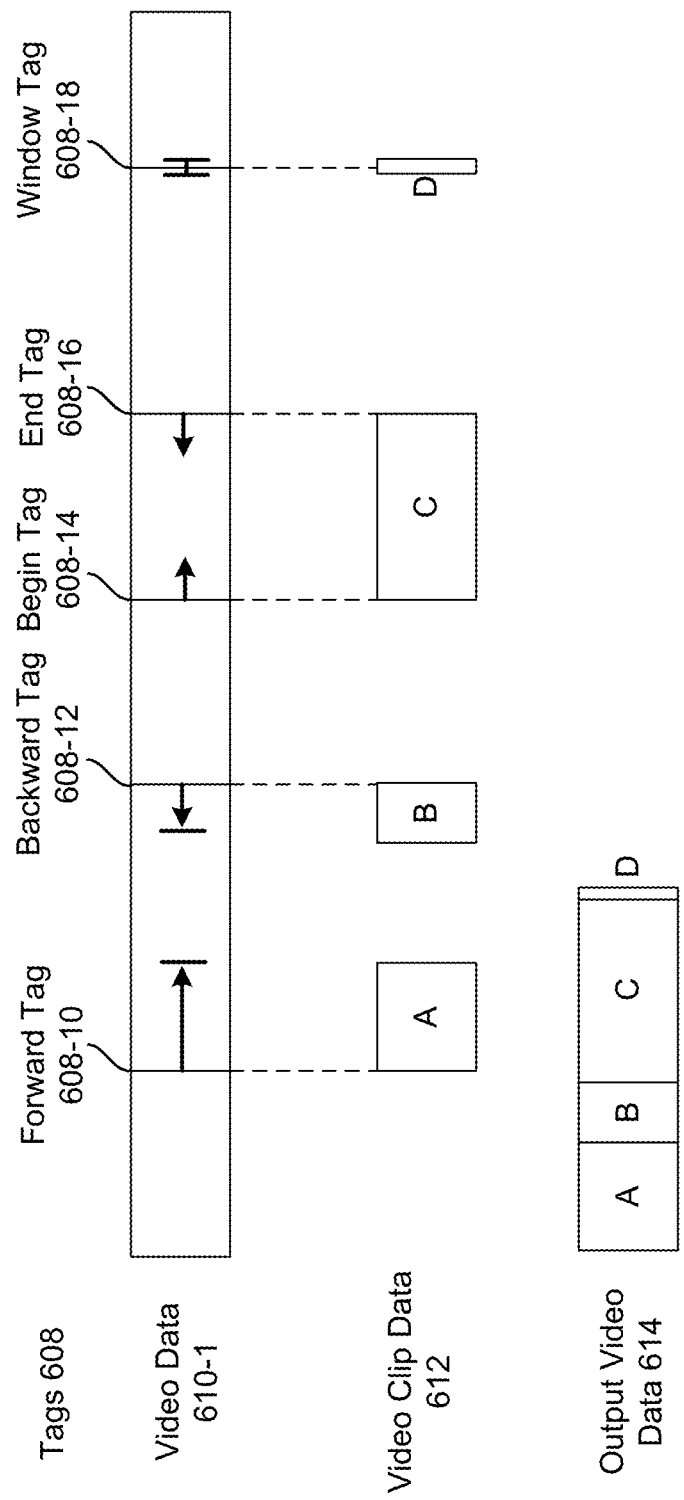

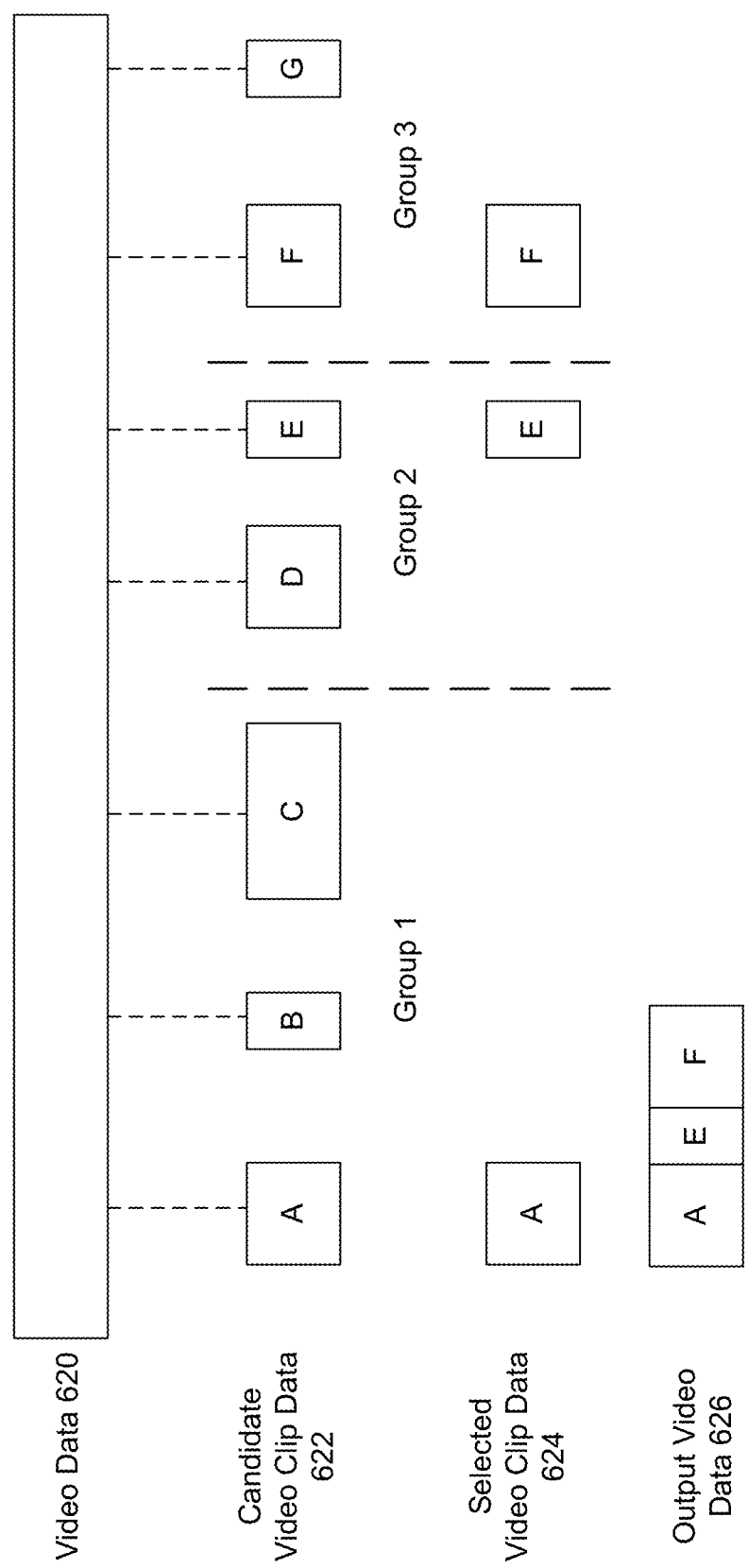

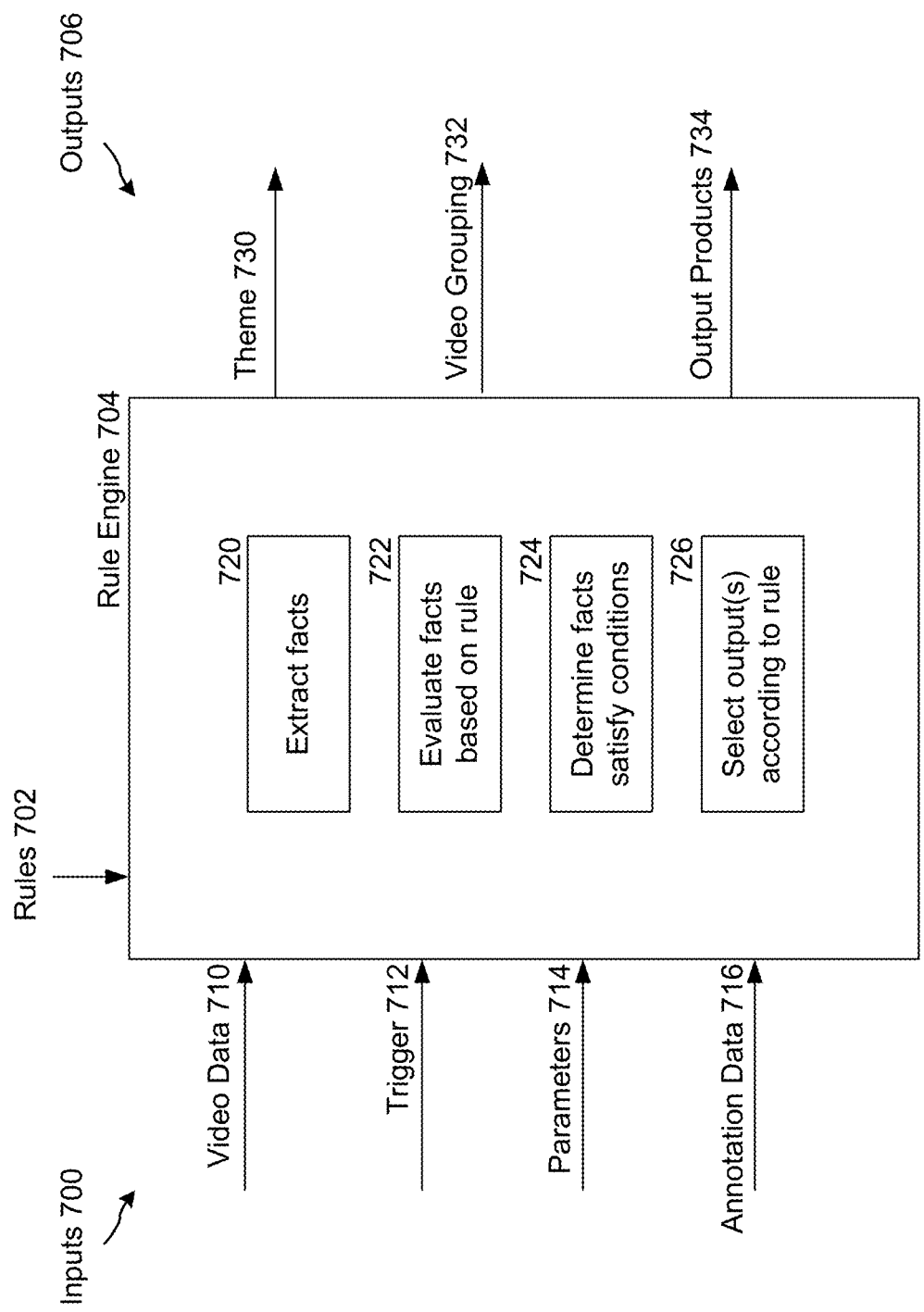

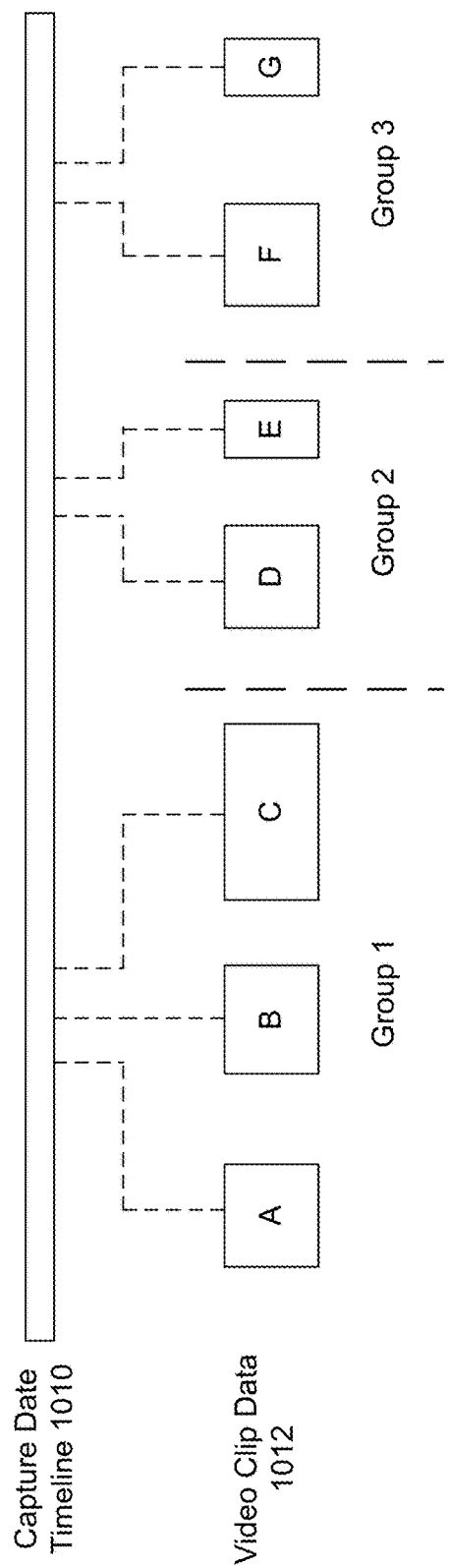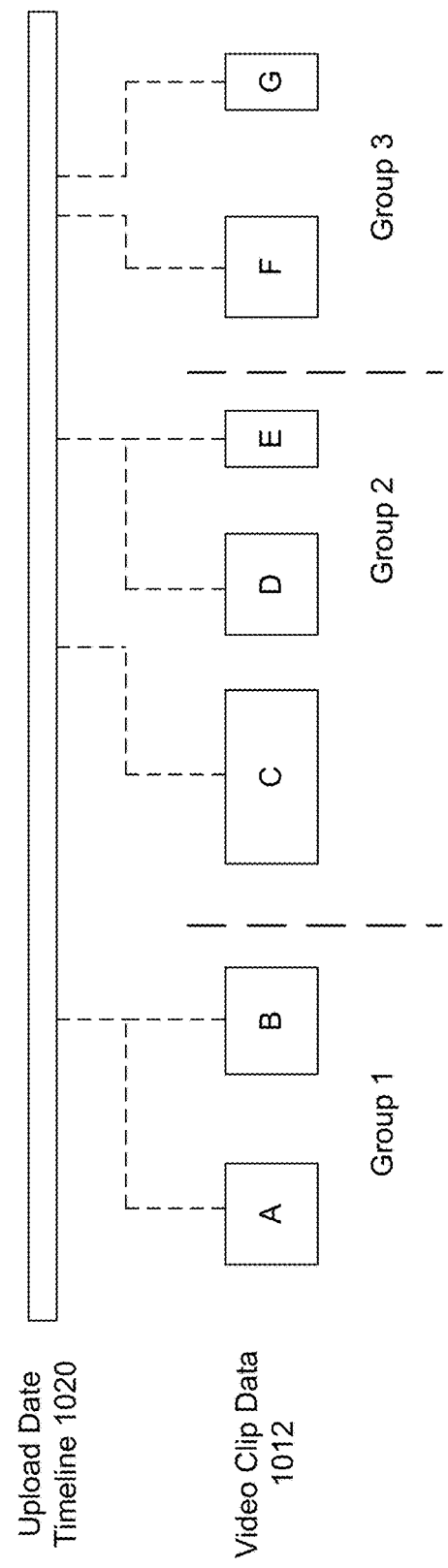

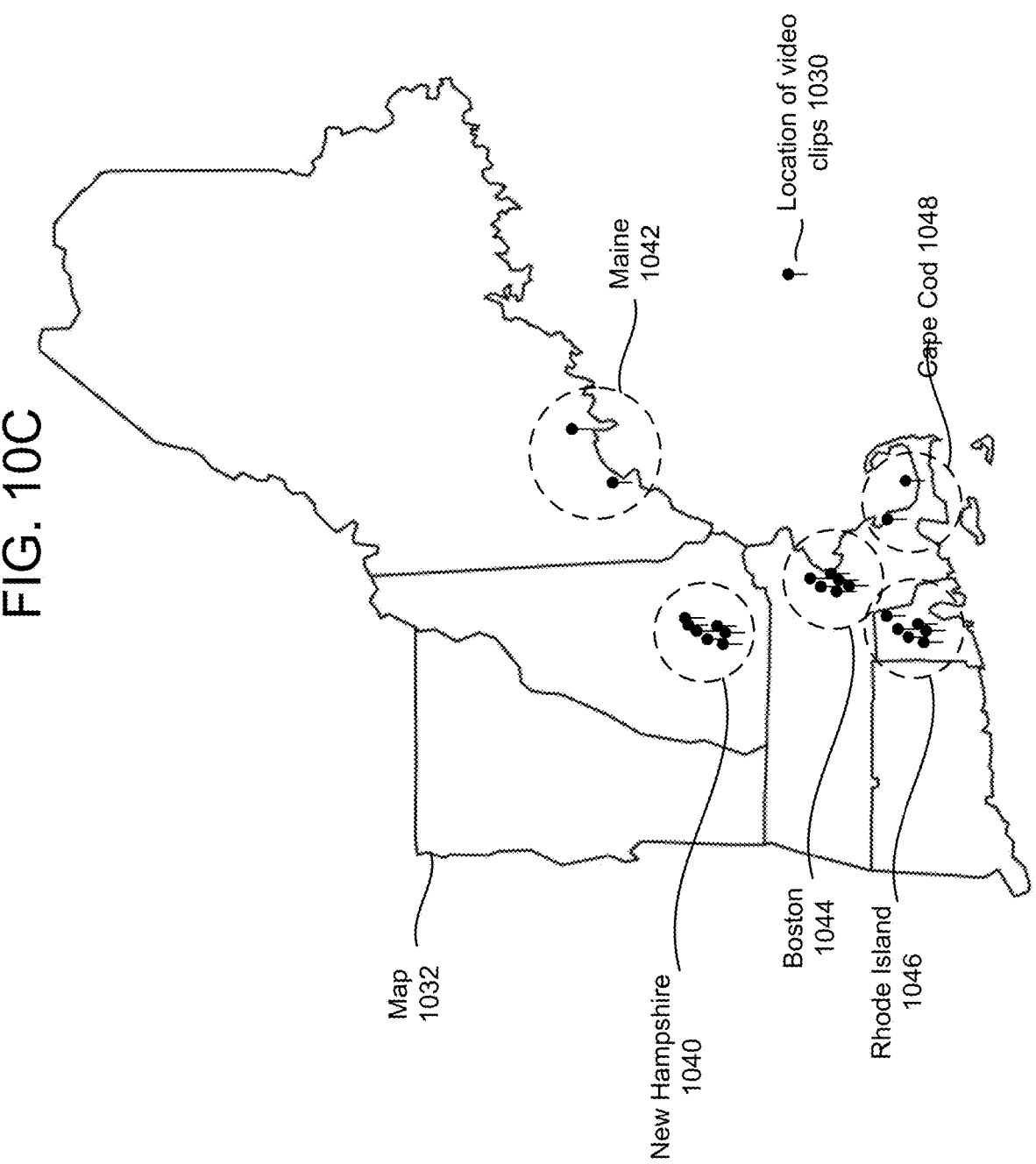

VIDEO RULE ENGINE

CROSS-REFERENCE TO RELATED APPLICATION DATA

This application is a continuation of, and claims the benefit of priority of, U.S. Non-provisional patent application Ser. No. 14/976,037, entitled "VIDEO RULE ENGINE," filed on Dec. 21, 2015, which is incorporated herein by reference in its entirety.

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve how the videos are generated.

BRIEF DESCRIPTION OF DRAWINGS

For a more complete understanding of the present disclosure, reference is now made to the following description taken in conjunction with the accompanying drawings.

FIGS. 2A-2B illustrate examples of cropping video data in time and space according to embodiments of the present disclosure.

FIGS. 5A-5H illustrate examples of annotation data according to embodiments of the present disclosure.

FIGS. 6A-6C illustrate examples of generating video summarizations according to embodiments of the present disclosure.

FIG. 7 illustrates an example of a rule engine according to embodiments of the present disclosure.

FIGS. 10A-10C illustrate examples of grouping video clips according to embodiments of the present disclosure.

DETAILED DESCRIPTION

Electronic devices are commonly used to capture video data. The devices may capture video data over a lengthy period of time and some devices may capture a wide field of view in order to capture video showing a wide area. Given the amount of captured video, certain devices may upload video data to a remote server with greater processing/storage resources for purposes of editing, storage, etc. However, editing the captured videos typically requires a user to review the captured videos to select videos and edit the selected videos, requiring an amount of time and a level of commitment. As a result, captured videos are often left unedited due to the amount of time and/or a lack of commitment.

To generate output data, including images and videos, devices, systems and methods are disclosed that apply rules to input video data to determine potential types of output to generate (and potential themes to apply to the output). Example output types may include items such as a video summary, images, a photo album, a photo collage, a time lapse or the like. Examples themes that may be applied to the output (e.g., video summary) may include "Birthday party," "Christmas," "Fall," "Holiday," "Road Trip," "Old fashioned" or the like. For example, the system may extract information that describes what is shown in the input video data (as well as other facts about the input video data such as location, time, etc.). The system may determine if certain conditions associated with a rule are met. If the conditions are met, the system may apply the rule, which may result in selecting a type of output (e.g., video summary, photo album or the like) and/or a theme (e.g., "Christmas," "Birthday party" or the like). Thus, the system may automatically select an optional theme and may apply the theme to a portion of the input video data to generate the type of output. In some examples, the system may generate an additional rule based on input modifying the generated output.

Figure 1:
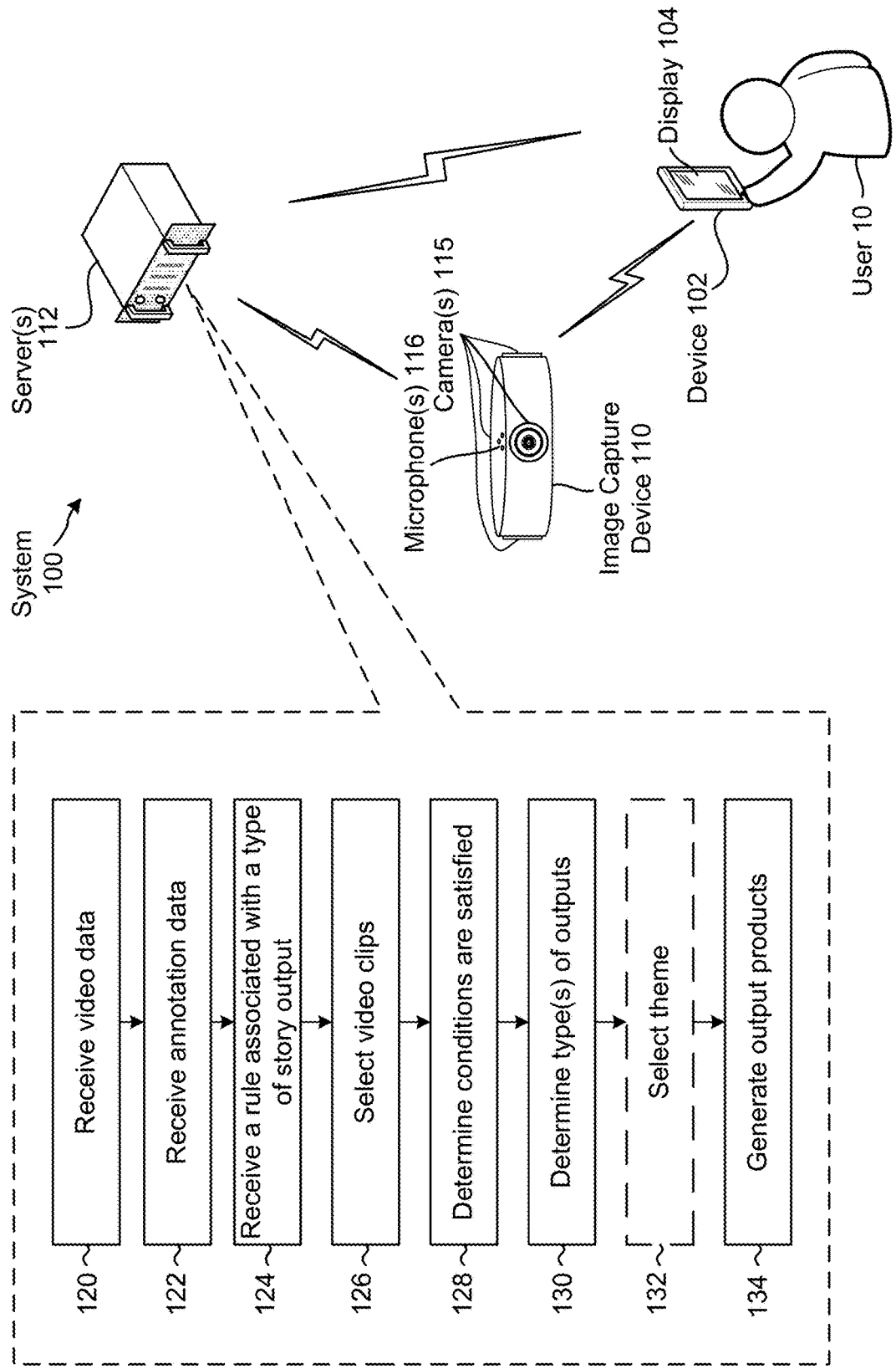
FIG. 1 illustrates an overview of systems for generating video summarizations using a rule engine according to embodiments of the present disclosure.

FIG. 1 illustrates an overview of a system 100 for implementing embodiments of the disclosure. The system 100 includes a device 102 having a display 104, an image capture device 110 (having camera(s) 115 and microphone(s) 116) and server(s) 112 all in communication with each other. While the following descriptions (of either FIG. 1 or other figures) may refer to one of the device 102, the image capture device 110 and/or the server(s) 112 performing steps illustrated in the drawings, the steps may be performed by any of the device 102, the image capture device 110 and/or the server(s) 112 without departing from the present disclosure. In addition, the device 102, the image capture device 110, the server(s) 112 or a combination thereof may receive input from a user 10 without departing from the disclosure. While FIG. 1 illustrates the system 100 including the device 102, the image capture device 110 and the server(s) 112, the system 100 may include any of the device 102, the image capture device 110, the server(s) 112 or a combination thereof without departing from the disclosure. For example, the image capture device 110 and the server(s) 112 may perform all of the steps illustrated in the drawings without communicating with the device 102.

As illustrated in FIG. 1, the server(s) 112 may receive (120) video data. In some examples, the video data may be captured by the image capture device 110 and may be panoramic video data having a field of view beyond 180 degrees, which corresponds to video data with an aspect ratio greater than 2:1. However, the present disclosure is not limited thereto and the video data may have any field of view/aspect ratio and/or may be captured by other devices.

The server(s) 112 may receive (122) annotation data associated with the video data. The annotation data may indicate subjects included in the video data or other characteristics of the video data (hereinafter, subjects and characteristics may be jointly referred to as "characteristics"), such as specific identities, people, faces, objects, pets, locations, landmarks, scenes, etc. represented in the video data or motion data, scene data, audio information, time data, directional data, etc. corresponding to the video data. In some examples, the annotation data may include an annotation database listing individual video frames and associated characteristics, a master clip table listing individual video clips and associated characteristics and/or video tag(s) indicating characteristics corresponding to specific video frame(s).

The server(s) 112 may receive (124) a rule associated with a story output. The story output may include type(s) of outputs and optionally theme(s) to apply to the generated outputs. The rule may include a set of input variables to check, a set of conditions over the input variables and a set of actions to perform when the set of conditions are satisfied. For example, a rule associated with Christmas may include conditions associated with Christmas, such as a date range or certain characteristics included in annotation data. Thus, the input variables may be fields in the annotation data such as "capture date," "objects visible" or the like, the set of conditions may include "capture date between December 15-26," "Christmas tree," "Christmas lights" or the like, and the set of actions to perform may include "generate video summarization using Christmas theme," "generate photo album including video frames" or the like. For example, the server(s) 112 may determine a set of conditions are met when a video clip was captured on December 24th and includes a Christmas tree with Christmas lights. Based on the conditions being met, the server(s) 112 may perform any actions indicated by the rule, such as generating a video summarization using the Christmas theme or the like. More detailed rules may be created for specific circumstances, such as a "Christmas morning" rule that only applies on December 25th when presents are represented in the video data.

A rule condition may include three components; one or more variables to check (e.g., title), an operator (e.g., contains) and a set of values (e.g., Christmas tree, Christmas lights or the like). In addition, the rule may include matching conditions and/or exception conditions. For example, matching conditions may be conditions associated with the rule output (e.g., type(s) of outputs and/or selected theme) and exception conditions may be exceptions to the rule that are not associated with the rule output. The exception conditions are optional, but if included the rule will not trigger if any of the exception conditions are satisfied. Thus, the rule will trigger if all matching conditions match except if any exception condition matches. However, the present disclosure is not limited thereto and the rule may trigger if only a portion of the matching conditions are satisfied and/or if a portion of the exception conditions are satisfied.

The server(s) 112 may select (126) video clips. In some examples, the server(s) 112 may select the video clips from a plurality of video clips based on annotation data without regard to rule(s). For example, the server(s) 112 may receive a plurality of video clips and may group the plurality of video clips into groups based on annotation data such as capture date, upload date geographic location and/or other characteristics indicated by the annotation data. The server(s) 112 may then apply rule(s), determine type(s) of outputs, optionally select theme(s) and generate output(s) for the individual groups. In other examples, the server(s) 112 may select the video clips from the plurality of video clips based on the rule(s). Thus, the server(s) 112 may receive the plurality of video clips and may select video clips satisfying one or more conditions associated with a rule. For example, the server(s) 112 may select video clips having a capture date within a specific date range without selecting video clips having a capture date outside the specific date range.

The server(s) 112 may determine (128) that conditions are satisfied for the rule. In some examples, the server(s) 112 may determine that the group of video clips collectively satisfy the conditions of the rule and may apply the rule to the group of video clips. In other examples, the server(s) 112 may determine that a portion of the group of video clips individually satisfy the conditions of the rule (e.g., each video clip in the portion satisfies all conditions) and may apply the rule to the group of video clips and/or the portion of the group of video clips that satisfy the rule. The server(s) 112 may choose how selective to be in determining conditions are satisfied based on a size of the group of video clips and a number of video clips included in the group. For example, if the group of video clips includes a relatively small number of video clips taken within a desired range (e.g., four video clips with a capture date of December 25), the server(s) 112 may apply the rule to the entire group if the conditions are satisfied collectively (e.g., video 1 satisfies a first condition but not a second condition, video 2 satisfies the second condition but not the first condition, etc.) or by an individual video clips in the group (e.g., video 1 satisfies the first condition and the second condition). Additionally or alternatively, if the group of video clips includes a relatively large number of video clips taken within a desired range (e.g., fifty video clips with a capture date between September 1 and November 25, which is a desired range for a rule associated with "Fall."), the server(s) 112 may select only a portion of the video clips that individually satisfy each of the conditions (e.g., video 1 satisfies the first condition and the second condition and is selected, but video 2 is not selected) and apply the rule to the selected portion.

The server(s) 112 may determine (130) type(s) of outputs (e.g., output products) associated with the rule. Examples of types of outputs include a video summarization, a video microsummarization, an image extracted from a video clip, a photo album of images extracted from video clips, a photo collage, a time lapse or the like. The server(s) 112 may determine a number of types of outputs using a single rule (e.g., the rule may select one or more types of outputs when conditions are satisfied) or using separate rules (e.g., a first rule may select first types of outputs and a second rule may select second types of outputs). Thus, the rules may specify a type of output based on a set of conditions. For example, if the selected video clips include a duration of time exceeding a threshold with a variety of annotation data, the rule may direct the server(s) 112 to generate a video summarization of the selected video clips. Similarly, if the selected video clips include a number of video frames having an interesting score (e.g., priority metric determined based on corresponding annotation data) above a threshold, the rule may direct the server(s) 112 to extract the video frames and generate a photo album.

In some examples, the rules may indicate a theme to apply when generating the type(s) of outputs. Therefore, the server(s) 112 may optionally select (132) a theme associated with certain types of outputs. For example, a rule that generates a video summarization may be associated with a theme that may be applied to the video summarization. The theme may be associated with one or more potential structure, sequence, layout, transition, special effect and/or music track that may be applied to video clips when creating output data (e.g., a video summarization or the like). Thus, the server(s) 112 may use the theme to make individual decisions as to which video clips to include in the video summarization and how to process the video clips or the like. In some examples, the theme may be applied to other types of outputs, such as a photo album (e.g., determining which images to include in the photo album), a photo collage (e.g., determining which images to include in the photo album), a time lapse (e.g., determining a pacing and/or subject for the time lapse) or the like.

The server(s) 112 may generate (134) outputs based on the rule. Thus, the server(s) 112 may generate the outputs (e.g., video summarization, photo album or the like) and may apply the selected theme to the outputs. While FIG. 1 illustrates an example flowchart associated with a single rule, the server(s) 112 may repeat steps 124-134 for multiple rules and may generate a variety of output products, using different themes or including different content, based on the multiple rules. For example, a first video clip may satisfy conditions associated with a first rule and a second rule, and the server(s) 112 may use the first video clip to generate a first video summarization and a photo album based on the first rule and to generate a second video summarization based on the second rule. Thus, the server(s) 112 may receive "raw" (e.g., unedited) video data and may generate a variety of output products that include different portions of the raw video data and present the raw video data using different presentations.

The video data may include multiple video segments (e.g., discrete video segments captured at different times) or may include a single video segment from a beginning time to an ending time. A video segment may include a single video clip (e.g., six video segments corresponds to six video clips captured at different times) and/or multiple video clips included in the video segment (e.g., a first portion of a video segment corresponds to a first video clip and a second portion of the video segment corresponds to a second video clip). In some examples, the server(s) 112 may extract individual video clips included in the video data based on priority metrics and the annotation data. For example, the server(s) 112 may determine a priority metric (e.g., interesting score) for individual video frames within the video data using the annotation data and/or retrieve priority metrics stored in the annotation data. As an example, a video frame including multiple faces interacting with identifiable objects, good lighting, etc. may correspond to a high priority metric, whereas a video frame including a landscape with no faces or identifiable objects may correspond to a low priority metric. Thus, the priority metrics may correspond to a likelihood of interesting content and the server(s) 112 may extract individual video clips based on the priority metrics. For example, the server(s) 112 may identify a series of video frames (e.g., 5-60 seconds) having a priority metric above a threshold and may generate a video clip including the series of video frames. Additionally or alternatively, the server(s) 112 may identify an interesting portion of a video segment using the priority metric values and may generate a video clip including the interesting portion.

While multiple aspects/embodiments/features may be described on their own (e.g., separate examples illustrated in the following figures), the system 100 may incorporate multiple different features/embodiments as part of the same system without departing from the scope of the disclosure. Thus, the system 100 may include any and all combinations of the features illustrated in the drawings without departing from the present disclosure.

As used herein, panoramic video data may include video data having a field of view beyond 180 degrees, which corresponds to video data with an aspect ratio greater than 2:1. As an example, a frame of panoramic video data may have a resolution of 5200 pixels by 1080 pixels. The panoramic video data may include data output from the one or more image sensors after being processed and/or compressed into a viewable video format. However, the present disclosure is not limited thereto and the video data may be video data having any aspect ratio without departing from the disclosure. The video data may include an edited clip or a video clip generated from larger video data, or, in some examples, the video data may be unedited video data captured by the camera(s) 115. For example, a user 10 of the device 102 may identify relevant video clips, or the user 10, the image capture device 110 and/or the server(s) 112 may identify portions of unedited video data for additional editing (e.g., such as specifying events of interest or regions of interest within the unedited video data).

As used herein, a video clip may be a short section of the video data (having any aspect ratio) including content determined to be "interesting" or desirable for purposes of video summarization. For example, video data may include several video clips that the device 102, the image capture device 110 and/or the server(s) 112 may extract from the video data. The device 102, the image capture device 110 and/or the server(s) 112 may determine a priority metric associated with a video clip using annotation data, the priority metric corresponding to a likelihood of interesting content, and may extract video clips based on the priority metric. Similarly, as used herein a moment may be a region of interest within a video clip. For example, a video clip may include one or several moments associated with a region of interest (e.g., position within the video frame, object/person within the video frame, etc.). A moment may include a bounding box around an interesting object or section of the video clip over time, and additional data may indicate a per-frame priority metric for the moment, a position of a detected face in the video clip, an identity of the detected face, or the like.

As used herein, a video tag is a tag (i.e., data structure) including annotation information that may be used in video summarization and/or rendering information that may be used to render a video. Examples of annotation information include an object, a person, an identity of a person, an angle relative to a camera axis, an area associated with a subject, a position associated with the subject, a timestamp (e.g., a time associated with receiving user input, a time associated with an individual video frame, a range of time associated with a sequence of video frames or the like) and/or other annotation data associated with video frame(s). Examples of rendering information include information used to render a video, such a sequence/order of video data in the rendered video, a begin point and end point associated with individual video clips included in the video, coordinates associated with cropping/panning within the video data, a theme, special effects, filters, layouts and/or transitions between video clips, audio data (e.g., musical track(s) or the like) and/or other editing effects known to one of skill in the art. As described in greater detail above with regard to FIG. 1, the server(s) 112 may determine a video snippet from video data and include parameters of the video snippet in a video tag for video summarization. Therefore, any steps describing processing and/or editing of the video data may also refer to storing processing information in a video tag for subsequent video processing and/or editing of the video data.

The server(s) 112 may render the video (e.g., generate the video summarization) using rendering information included in the generated video tags and/or an edit decision list (EDL). For example, the rendering information may indicate an order of the selected video clips, the begin point and end point associated with the individual video clips, the selected theme, the selected panning for the individual video clip(s), the special effects, the audio data and/or other editing steps. As a first example, a first video tag may indicate the order of the selected video clips, a second video tag may indicate the begin point and the end point associated with a single video clip, etc. As a second example, a single video tag may include multiple edits, such as a first video tag indicating the begin point and the end point associated with a single video clip along with the selected panning for the single video clip and the special effects and/or audio data associated with the selected video clip. The video tags may correspond to individual video clip or a group of video clip without departing from the disclosure.

A moment may be associated with a region of interest within a video clip, which may include a time range (e.g., beginning frame and an ending frame) and a position (e.g., x and y pixel coordinates) within the video data. The server(s) 112 may generate video clips based on the time range associated with the moment, but a video clip may include an entirety of the pixel coordinates associated with the video data over the time range. Therefore, the server(s) 112 may determine a region of interest associated with a moment and may determine framing windows that include a portion of the pixel coordinates (e.g., a cropped image). Thus, the server(s) 112 may render the framing windows when generating the video summarization, such that the video summarization only includes the portion of the pixel coordinates associated with the region of interest (indicated by the framing windows) over the time range.

The image capture device 110 may capture the panoramic video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the panoramic video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures panoramic video data having an aspect ratio exceeding 2:1.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The panoramic video data may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the panoramic video data (e.g., panoramic image) may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a position within the panoramic image. For example, if the panoramic image has a resolution of 7680 pixels by 1080 pixels, a pixel coordinate of a bottom left pixel in the panoramic image may have pixel coordinates of (0, 0), a pixel coordinate of a top left pixel in the panoramic image may have pixel coordinates of (0, 1080), a pixel coordinate of a top right pixel in the panoramic image may have pixel coordinates of (7680, 1080) and a bottom right pixel in the panoramic image may have pixel coordinates of (7680, 0). Similarly, if the cropped image has a resolution of 1920 pixels by 1080 pixels, a pixel coordinate of a bottom left pixel in the cropped image may have pixel coordinates of (0, 0) in the panoramic image, a pixel coordinate of a top left pixel in the cropped image may have pixel coordinates of (0, 1080) in the panoramic image, a pixel coordinate in a top right pixel in the cropped image may have pixel coordinates of (1920, 1080) in the panoramic image and a bottom right pixel in the cropped image may have pixel coordinates of (1920, 0) in the panoramic image.

Video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the video tags and/or annotation data, thus including in the video summarization the portions of video data (including the objects, angles, and times or the like) indicated by a user 10 and/or determined to be interesting (e.g., priority metric exceeding a threshold) by the server(s) 112. For example, a user 10 may be attending a party and may want to capture the party without being distracted from the party itself. Therefore, the user 10 may locate the image capture device 110 at a central location in a room during the party and may optionally generate tags using the device 102 to identify moments of particular interest to be included in the video summarization. The image capture device 110 may capture video data throughout the party, but the user 10 may generate tags for specific moments or specific guests at the party. The server(s) 112 may generate additional video tags and/or generate a number of video clips using the video tags, where the video clips are associated with a particular time/timestamp, date, and/or position based on the video tags. Additionally or alternatively, the server(s) 112 may determine video clips using annotation data, for example by determining a priority metric for individual video frames in the video data and generating video clips including video frames having a highest priority metric value. The video clips may be ordered chronologically in the video summary, where included video clips are ordered by their relative recording time/timestamp, but the present disclosure is not limited thereto and the server(s) 112 may determine an order of the video clips. The video summarization may also include a collection of still images, in a manner akin to a picture slideshow, where the still images are selected from the video data and may include images that were the subject of tags received as described above.

As part of generating the video summarization, the device 102 may display output video data and may request input from a user 10 of the device 102. For example, the user 10 may instruct the device 102 to generate additional video data (e.g., create an additional video summarization), to modify an amount of video data included in the output video data (e.g., change a beginning time and/or an ending time to increase or decrease a length of the output video data), to modify a portion of the video data included in the output video data (e.g., zoom or pan within the video data), shift a time window associated with a video snippet within the output video data (e.g., change a beginning time of a video snippet without changing the time window), specify an object of interest, specify an event of interest, specify or modify an angle associated with the output video data, increase or decrease a panning speed or the like. Thus, the server(s) 112 may generate the output video data, the device 102 may display the output video data to the user 10 and receive feedback from the user 10 and the server(s) 112 may generate additional or different output video data based on the user input. The video tags may be configured to be similarly modified by the user 10 during a video editing process.

FIG. 2A illustrates an example of panoramic video data according to embodiments of the present disclosure. As illustrated in FIG. 2A, an image capture device 110 may use camera(s) 115 to capture panoramic video data 210 including a panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

Figure 2B:
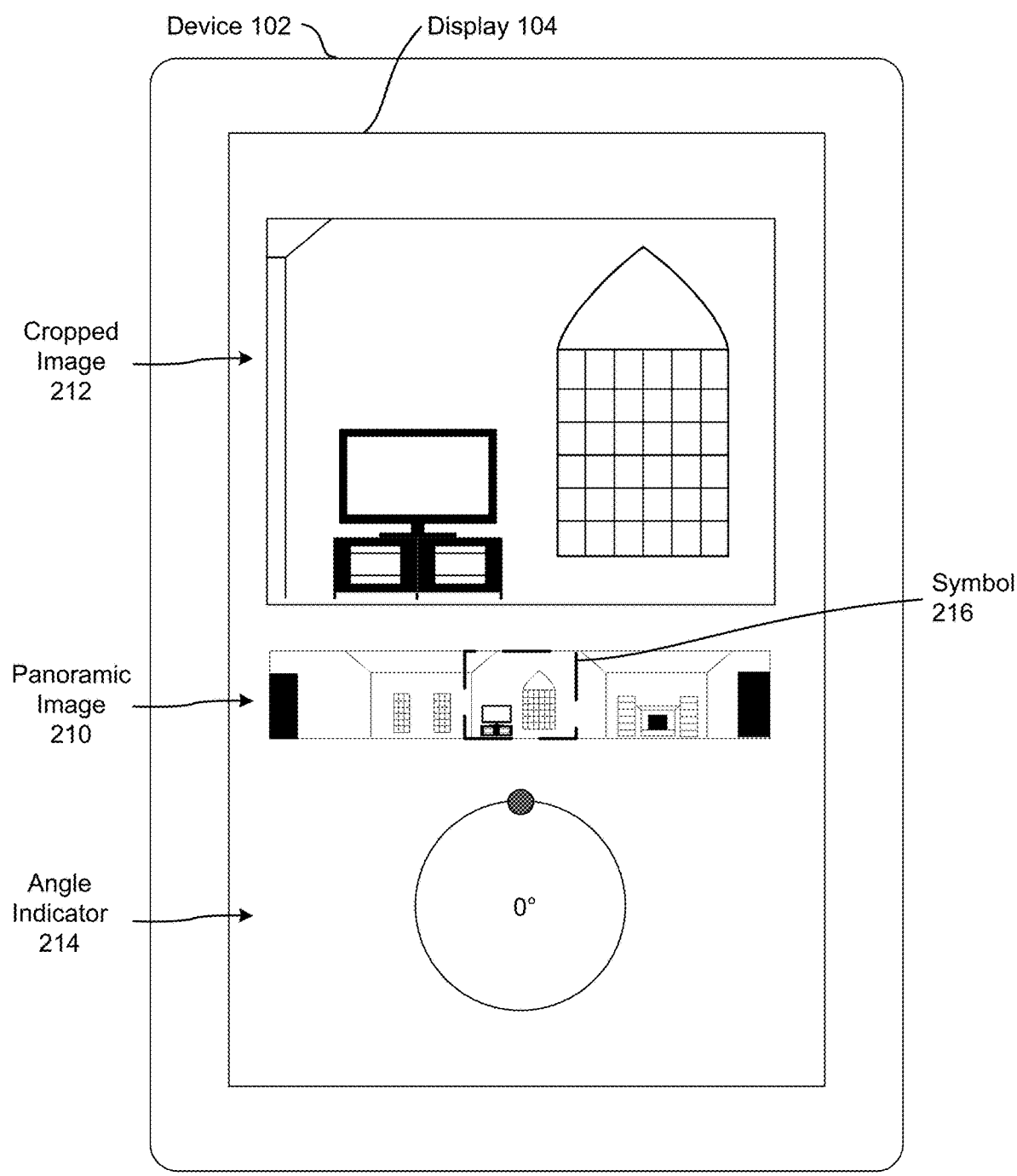

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user 10 of the device 102 that the cropped image 212 only displays a portion of the overall panoramic image 210 and the position of the cropped image 212 within the panoramic image 210. In addition, a symbol 216 may indicate to the user 10 the portion of the panoramic image 212 included in the cropped image 212. Using the user interface illustrated in FIG. 2B, the user 10 may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

Figure 3:
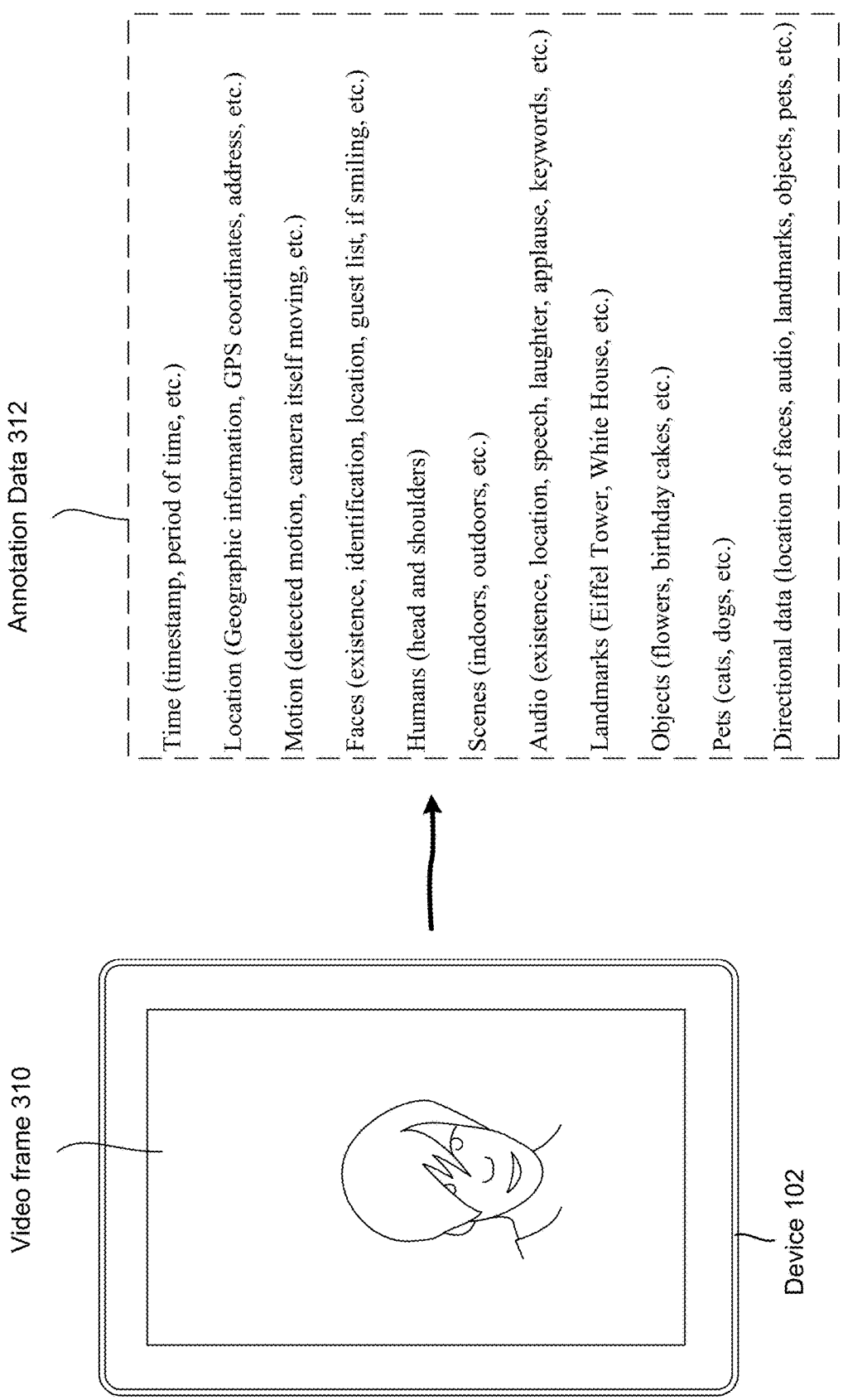
FIG. 3 illustrates an example of annotation data according to embodiments of the present disclosure.

FIG. 3 illustrates an example of types of annotation data according to embodiments of the present disclosure. The annotation data may be generated prior to step 122 of FIG. 1 by the server(s) 112 and/or another device. For example, the server(s) 112 may analyze a video frame 310 and generate annotation data 312, which may include time (e.g., a timestamp, a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame). In some examples, the annotation data may indicate an area within (e.g., x and y pixel coordinates) the video data that is of interest. For example, the image capture device 110 may capture video data including a first portion (e.g., a stage of a concert or the like) and a second portion (e.g., a back wall opposite the stage), and the annotation data may indicate the area associated with the first portion. Using the annotation data, the server(s) 112 may emphasize the first portion and omit the second portion.

In addition to the annotation data illustrated in FIG. 3, the server(s) 112 may generate additional annotation data. For example, the server(s) 112 may generate emotional data, which may include emotional detection (e.g., determining a mood such as happy, sad, excited, etc.) for an individual, a group of people, the video frame 310 or a combination thereof. As another example, the server(s) 112 may determine if a concert or other event is represented in the video frame 310 and may match the geographic location to the event. For example, the server(s) 112 may determine venues in proximity to the geographic location, events scheduled for the venues and determine if one of the events is represented in the video data. In some examples, the server(s) 112 may detect indications of an event (e.g., detecting a crowd, an amphitheater, a concert hall or the like) and may compare the geographic information to venues in proximity as a result of detecting the indications.

In some examples, the server(s) 112 may perform speech recognition on speech detected in audio associated with the video data to generate output text and may embed the output text in the annotation data. As a first example, the server(s) 112 may include output text corresponding to all of the speech detected in the audio, such as a transcription of a conversation or the like. As a second example, the server(s) 112 may analyze the output text and include a portion of the output text corresponding to key phrases. For example, the server(s) 112 may recognize "Happy Birthday" or a particular name in the output text and include the recognized phrase in associated annotation data.

Figure 4:
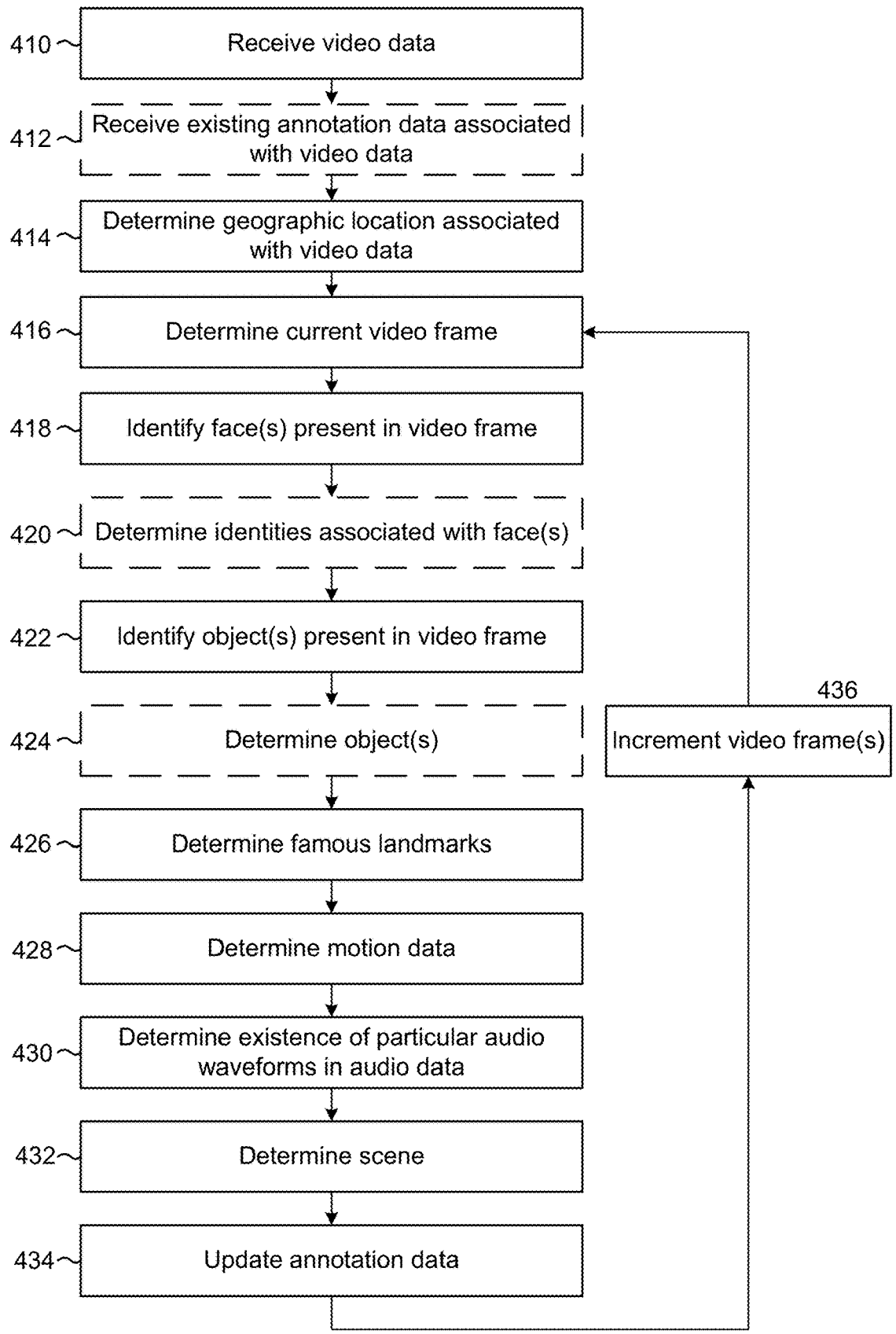
FIG. 4 is a flowchart conceptually illustrating an example method for generating annotation data according to embodiments of the present disclosure.

FIG. 4 is a flowchart conceptually illustrating an example method for generating annotation data according to embodiments of the present disclosure. As discussed above, the annotation data may be generated by the server(s) 112 or a remote device prior to receiving the annotation data in step 122. For example, the server(s) 112 may generate annotation data upon receiving individual video clips, upon receiving video data or upon receiving a request for a video summarization. For ease of explanation, some of the steps illustrated in FIG. 4 are explicitly depicted as optional, indicated by dashed lines. However, any of the steps illustrated in FIG. 4 may be omitted without departing from the present disclosure. In addition, while the following description refers to the steps illustrated in FIG. 4 being executed by the server(s) 112, some or all of the steps illustrated in FIG. 4 may be executed by the device 102, the image capture device 110, the server(s) 112, a remote device or any combination thereof.

As illustrated in FIG. 4, the server(s) 112 may receive (410) video data and may optionally receive (412) existing annotation data associated with the video data. The server(s) 112 may receive the video data from a remote device (e.g., the device 102, the image capture device 110, a second server(s) 112 or the like) or by accessing the video data on the server(s) 112. The existing annotation data may have been determined by any of the device 102, the image capture device 110, the server(s) 112 and/or a remote device prior to the system receiving the video data in step 410. While video data may include multiple video clips, the video data illustrated in FIG. 4 refers to video data associated with a single video clip (e.g., a video clip captured from a beginning time to an ending time). The server(s) 112 may determine (414) a geographic location associated with the video data, such as a Global Positioning System (GPS) coordinates associated with where the video data was captured. However, the geographic location is not limited to the GPS coordinates and the server(s) 112 may determine a geographic location based on the GPS coordinates. If the video data is captured while in motion (e.g., in a plane, a car or other vehicle), the geographic location may be associated with the beginning time or the ending time of the video data.

The server(s) 112 may determine (416) a current video frame and may identify (418) face(s) present in the video frame. For example, the server(s) 112 may analyze the video frame and identify the face(s) based on facial recognition, identifying head and shoulders, identifying eyes, smile recognition or the like. Optionally, the server(s) 112 may determine (420) identities associated with the face(s). For example, the server(s) 112 may employ facial recognition and a database of identities, such as social networking database, to determine the identities. In some examples, the video data will be tagged with identities of faces represented in the video data. Thus, the server(s) 112 may determine the identity of a face in a video frame from a list of identities associated with the video data.

The server(s) 112 may identify (422) object(s) present in the video frame. For example, the server(s) 112 may identify object(s) such as physical objects (e.g., flowers, toys, clothing or the like), animals (e.g., pets such as cats, dogs, wildlife or the like), vehicles (e.g., cars, airplanes, or the like) or the like. Optionally, the server(s) 112 may determine (424) object(s), which may include determining a type of object, a brand of the object, a name for the object or the like. Thus, whereas step 422 identifies an existence of the object in the video frame, step 424 identifies an identity of the object or otherwise recognizes what the object is. The server(s) 112 may determine (426) famous landmarks (e.g., Big Ben, a famous cathedral, monument or the like) represented in the video frame based on the geographic location. For example, the geographic location may be in proximity to a monument and the server(s) 112 may identify the monument within the video frame.

The server(s) 112 may determine (428) motion data, including motion data associated with the image capture device (e.g., movement of the image capture device while capturing the video data) and objects represented in the video data (e.g., movement of an object relative to the image capture device). The server(s) 112 may determine (430) an existence of particular audio waveforms in audio data associated with the video data. For example, the server(s) 112 may identify an existence of speech, laughter, applause or the like. In some examples, as discussed in greater detail below with regard to FIG. 9, the server(s) 112 may identify music in the audio data. The server(s) 112 may determine (432) a scene associated with the video frame. For example, the server(s) 112 may determine if the video frame was captured indoors or outdoors and may determine other characteristics that may be useful in determining a scene associated with the video frame. Finally, the server(s) 112 may update (434) the annotation data associated with the video frame and increment (436) video frame(s) (e.g., one video frame, several video frames or the like) and repeat steps 416-434. For example, the server(s) 112 may increment video frames linearly to update annotation data for video frames in the video data by one or at a fixed increment. Additionally or alternatively, the server(s) 112 may increment the video frame(s) nonlinearly to focus on annotating interesting frames, which may be determined based on a low resolution preview or other techniques. Thus, the server(s) 112 may determine an amount to increment each time step 436 is performed and the amount to increment may vary without departing from the present disclosure.

In addition to using annotation data to generate video summarizations, the server(s) 112 may use the annotation data for additional functionality. As a first example, the server(s) 112 may extract information about a user 10 from the annotation data and may use the extracted information to target advertisements to the user 10. As a second example, the server(s) 112 may collect annotation data from a plurality of users and/or video clips to collate information. Thus, the server(s) 112 may create a database of annotation data and may use the database to identify trends, brands or the like from video data from a variety of sources.

Figure 5G:

FIGS. 5A-5H illustrate examples of annotation data according to embodiments of the present disclosure. As illustrated in FIG. 5A, the server(s) 112 may store annotation data in an annotation database 510. The annotation database 510 may include the annotation data discussed above (e.g., time, location, motion, faces, humans, scenes, audio, landmarks, objects, pets, directional data, etc.) for individual video frames. As illustrated in FIG. 5A, the annotation database 510 includes Frame 1, Frame 2, Frame 3, Frame 10, Frame 11, Frame 30 and Frame 35, although the annotation database 510 may include any number of video frames and is not limited to the example illustrated in FIG. 5A. In some examples, the annotation database 510 may include an entry for individual video frames included in video data (e.g., every video frame has an entry). In other examples, the annotation database 510 may include an entry every fixed number of video frames (e.g., 5th, 10th, 15th etc.). In some examples, the annotation database 510 may include an entry whenever the annotation data changes (e.g., annotation data is associated with intervening video frames until a following entry in the annotation database 510). Additionally or alternatively, the annotation database 510 may include an entry for select video frames without departing from the present disclosure. For example, the server(s) 112 may determine a priority metric (discussed below) for individual video frames and store the annotation data associated with individual video frames having a priority metric exceeding a threshold. Other techniques for storing annotation data may also be used.

The server(s) 112 may determine the priority metric (e.g., interesting score) using the annotation data. For example, the server(s) 112 may use an algorithm or other technique to calculate the priority metric based on objects included in the video frame or other characteristics of the video frame. The priority metric may be used to generate video clips and/or to rank individual video frames. For example, the server(s) 112 may determine first video frames associated with priority metrics exceeding a threshold and may group first video frames in proximity to generate a video clip. As an example, the server(s) 112 may determine that Frames 1-11 are associated with priority metrics exceeding the threshold and may generate a video clip including Frames 1-11.

The annotation database 510 illustrated in FIG. 5A may include video frames for multiple clips included in the video data. However, the disclosure is not limited thereto and FIG. 5B illustrates an annotation database 512 for an individual video clip. As illustrated in FIG. 5B, the annotation database 512 includes Frame 1, Frame 2, Frame 3, Frame 10, Frame 11, Frame 30 and Summary Data associated with the overall video clip. The annotation database 512 includes a series of columns corresponding to annotation data that is included in the video clip and indicates whether the annotation data is represented in each video frame. For example, Face 1 is represented in Frame 1, Frame 2, Frame 3, Frame 10, Frame 11 and Frame 30, while Face 3 is only represented in Frame 11 and Frame 30. Thus, the annotation database 512 may indicate the annotation data associated with individual video frames.

The summary data may include statistics for the video clip that are unique to the particular video clip. For example, the summary data may include a frame selector statistic identifying transitions within the video clip (e.g., grouping the video frames based on a similarity index) or the like. Additionally or alternatively, the summary data may include video "fingerprints" that indicate characteristics of the video clip that may be used to identify similar video clips. For example, the characteristics of the video clip may include feature vectors, histograms of image data, gradients of the image data, histograms of gradients, a signature of the image data or the like that may be used to determine if image data is similar between video clips.

While the annotation database 512 illustrated in FIG. 5B lists individual frames for the video clip, video frames may be grouped together as illustrated in the annotation database 514 illustrated in FIG. 5C. For example, the annotation database 514 groups Frames 1-200, Frames 350-600, Frames 800-1200, Frames 1500-1650 and Frames 2000-2200, Frames 2400-2550. The annotation database 514 may group the video frames based on annotation data and/or the frame selector statistic for the overall video clip.

FIG. 5D illustrates a Master Clip Table (MCT) 520 that includes Clips 1-7. The MCT 520 may indicate which frames are associated with a video clip (e.g., Clip 1 may be associated with Frames 1-450, which corresponds to a 15 second video clip at 30 frames per second), a priority metric associated with the video clip, summary data (as discussed above with regard to FIG. 5B) associated with the video clip and/or a time/position of interesting moments within the video clip (e.g., pixel coordinates associated with individual timestamps corresponding to the moment).

In some examples, the user 10 may generate a video clip, which may be included in the MCT 520 with or without annotation data. The server(s) 112 may annotate the user-generated video clip, although the present disclosure is not limited thereto. A moment may be a bounding box around an interesting object or section of the video clip over time. Additional data may be included about a moment, such as a per-frame interest rating, a position of a detected face, an identity of a detected face or the like.

The server(s) 112 may generate the MCT 520 based on priority metrics determined from the annotation data. The server(s) 112 may determine a priority metric associated with each video frame in the video data, with individual video frames (e.g., selected video frames based on content represented in the selected video frames), with groups of video frames (e.g., tracks or moments) and/or with video clips. For example, the server(s) 112 may determine first priority metrics associated with individual video frames to determine interesting portions of the video data. Using the annotation data, the server(s) 112 may identify transitions within the video data (e.g., tracks), may group interesting video frames based on the transitions to determine moments and may determine second priority metrics associated with individual moments. The server(s) 112 may then extract video clips including interesting moments and may determine third priority metrics associated with individual video clips. Thus, the server(s) 112 may identify the most interesting video frames, may identify moments including the most interesting video frames and may generate video clips including the most interesting moments. The server(s) 112 may compare the priority metrics to each other (e.g., relative priority metrics) or to a global threshold (e.g., absolute priority metrics) to generate the MCT 520.

In some examples, the MCT 520 may include every video clip included in the video data (e.g., the video data is segmented into sequential video clips, each of which is included in the MCT 520), but the disclosure is not limited thereto and the MCT 520 may include only a portion of the video clips (e.g., interesting video clips associated with a portion of the video data). While the MCT 520 illustrated in FIG. 5D includes video clips associated with a single sequential stream of video data (e.g., video captured at one time), the disclosure is not limited thereto. Instead, a MCT 522 may include video clips associated with multiple streams of video data (e.g., video captured at more than one time, such as separate recordings) as illustrated in FIG. 5E. As illustrated in FIG. 5E, the MCT 522 includes Clips 1-4 captured at a first time (e.g., capture date of Sep. 15, 2015) and Clips 50-52 captured at a second time (e.g., capture data of Sep. 24, 2015). Additionally or alternatively, the MCT 522 may include video clips from separate recordings on the same date (e.g., first video recording at one point on Sep. 15, 2015, second video recording at a later point on Sep. 15, 2015) and/or video clips captured by multiple image capture devices 110 without departing from the disclosure.

FIG. 5F illustrates a detection results database 530. Instead of including individual rows for individual video frames or groups of video frames, the detection results database 530 includes individual rows for annotation data and indicates groups of video frames including the annotation data. For example, Face 1 may be associated with a first group of video frames (e.g., frames 1-150), a second group of video frames (e.g., frames 600-900), a third group of video frames (e.g., frames 1500-2000) etc. Thus, the detection results database 530 indicates individual sections of the video data associated with the annotation data. Additionally or alternatively, the detection results database 530 may indicate multiple groups of video frames in a single column without departing from the disclosure.

FIG. 5G illustrates a face database 540 including a list of unique faces represented in the video data and indicating which video clips are associated with each of the individual faces. The server(s) 112 may analyze individual video clips using facial recognition (e.g., a facial recognition engine or the like) using Face Feature Vectors (which includes information that characterizes the appearance of individual faces under various poses and/or illuminations), may identify unique faces within each of the video clips, and may determine if the same face is detected in multiple video clips. For example, Face 1 is represented in Clip 1, Clip 2 and Clip 5 but not represented in Clip 3 and Clip 4. The server(s) 112 may include one or more images associated with individual faces (stored in the Face Feature Vector), or may access a database with images of individual faces in different poses. In some examples, an identity of an individual face may be determined (e.g., based on user input or using facial recognition processing) and stored in the face database 540. In some examples, a first unique face represented in first video clips may be associated with a second unique face represented in second video clips and the information may be combined in the face database 540. For example, a user 10 may be identified as a first unique face (e.g., Face 1 represented in Clips 1, 2 and 5) and a second unique face (e.g., Face 4 represented in Clip 3). Using identity information, user input, updated facial recognition processing or additional video data, the server(s) 112 may determine that the first unique face and the second unique face are associated with the user 10 and may merge Face 1 and Face 4. Thus, the face database 540 may be updated over time based on subsequent processing. While FIG. 5G illustrates the face database 540 indicating video clips associated with individual faces, the disclosure is not limited thereto and the face database 540 may indicate video frames associated with the individual faces without departing from the disclosure.

FIG. 5H illustrates an example of a video clip annotated with two moments, which are tracked over the course of the video clip. As illustrated in FIG. 5H, a video clip 530 may be 10 seconds long and may include a field of view of 360 degrees. In a first video frame (e.g., Frame 1), a first person 11-1 is at a first position and a second person 11-2 is at a second position. As the video clip progresses, the first person 11-1 travels in a first direction towards the second position and the second person 11-2 travels in a second direction towards the first position. The first person 11-1 and the second person 11-2 meet in a third video frame (e.g., Frame 3) and, remaining in proximity to each other, both move in the first direction (e.g., Frame 5 and Frame 6). The server(s) 112 may annotate the video clip 530 with two moments, a first moment 532-1 associated with the first person 11-1 (e.g., bounding box surrounding the first person 11-1) and a second moment 532-2 associated with the second person 11-2 (e.g., bounding box surrounding the second person 11-2). In some examples, the server(s) 112 may annotate the video clip 530 with a third moment indicating positions and/or video frames where the first person 11-1 and the second person 11-2 are in proximity. For example, the third moment may be a bounding box including the first person 11-1 and the second person 11-2 in Frames 3-6.

Figure 6B:
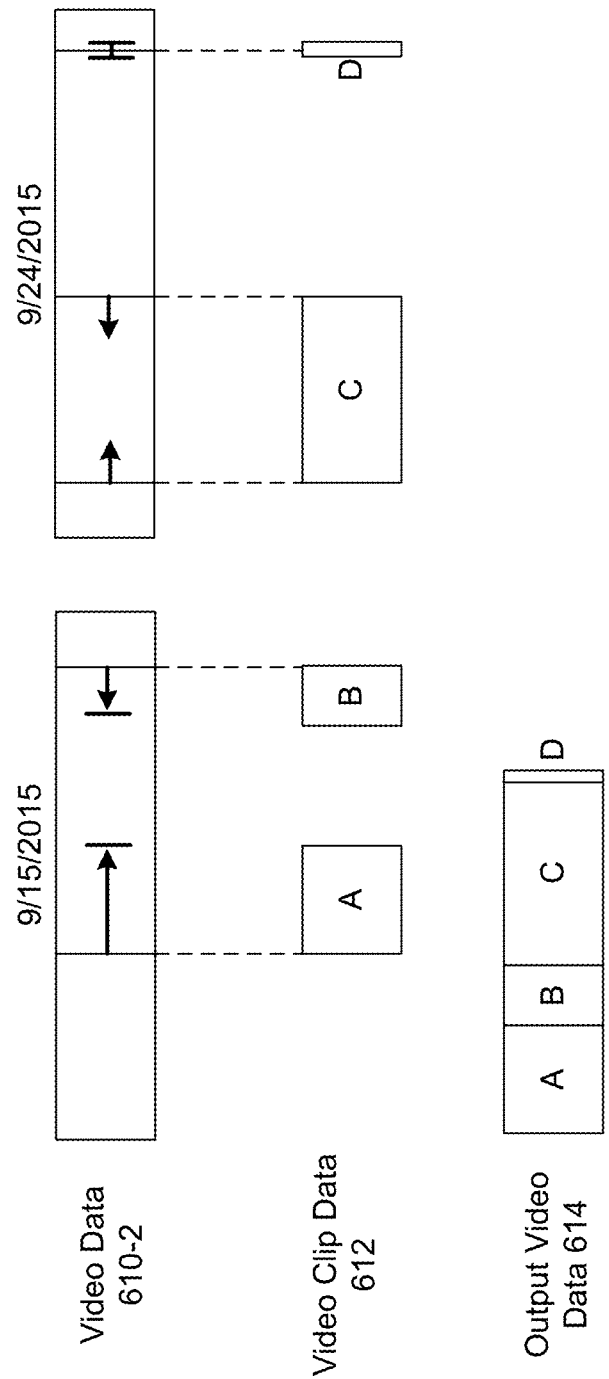

FIGS. 6A-6C illustrate examples of generating video summarizations according to embodiments of the present disclosure. As illustrated in FIG. 6A, tags 608 may be associated with specific moments within first video data 610-1, and the server(s) 112 may use the tags 608 to determine video clip data 612 associated with each of the tags 608. The server(s) 112 may then generate output video data 614 including at least portions of the video clip data 612.

To illustrate examples of different tags, FIG. 6A illustrates a forward tag 608-10, a backward tag 608-12, a begin tag 608-14, an end tag 608-16 and a window tag 608-18. The forward tag 608-10 is associated with a forward looking command, such as when the server(s) 112 determines that there is a moment of interest in the near future. The video clip data 612-A associated with the forward tag 608-10 may extend between a beginpoint, such as a timestamp associated with the forward tag 608-10, and an endpoint subsequent to the beginpoint. The server(s) 112 may determine the endpoint based on the theme, the annotation data, user preferences and/or user input associated with the forward tag

608-10. For example, the server(s) 112 may determine the endpoint based on annotation data, a priority metric included in the annotation data falling below a threshold, a fixed duration of time for all forward tags, a variable duration of time specified by the forward tag 608-10, an audio energy level of audio data associated with the first video data 610-1 falling below a threshold, when no movement is detected in the first video data 610-1 for a duration of time or the like. Thus, the forward tag 608-10 may begin at a first moment in time and may extend until a second moment in time. The period between the first moment in time and the second moment in time may be preconfigured (for example, 30 seconds) and/or may be adjustable.

The backward tag 608-12 is associated with a backward command, such as when the server(s) 112 identifies that a moment of interest recently occurred. The video clip data 612-B associated with the backward tag 608-12 may extend between a beginpoint, prior to a timestamp associated with the backward tag 608-12, and an endpoint subsequent to the timestamp. The server(s) 112 may determine the beginpoint based on the theme, the annotation data, user preferences and/or user input associated with the backward tag 608-12. For example, the server(s) 112 may determine the beginpoint based on annotation data, a priority metric included in the annotation data exceeding a threshold, a fixed duration of time for all backward tags, a variable duration of time specified by the backward tag 608-12, an audio energy level falling below a threshold immediately prior to the timestamp associated with the backward tag 608-12, when no movement was detected in the first video data 610-1 for a duration of time immediately prior to the timestamp associated with the backward tag 608-12 or the like. Similarly, the server(s) 112 may determine the endpoint as discussed above or using the timestamp associated with the backward tag 608-12. Thus, the backward tag 608-12 may begin at a first moment in time prior to when the backward tag 608-12 was received and may extend until a second moment in time, such as when the backward tag 608-12 was received. The period between the first moment in time and the second moment in time may be preconfigured (for example, 30 seconds) and/or may be adjustable.

The begin tag 608-14 and the end tag 608-16 are associated with a start/stop command, respectively, such as when the server(s) 112 identifies a beginning and an end of a moment of interest. The video clip data 612-C may extend between a beginpoint associated with the begin tag 608-14 and an endpoint associated with the end tag 608-16. While the beginpoint is associated with the begin tag 608-14, the beginpoint is not limited to a timestamp associated with the begin tag 608-14. Instead, the server(s) 112 may determine the beginpoint as discussed above, with the begin tag 608-14 being used as a rough estimate of the beginpoint. Similarly, the endpoint is not limited to a timestamp associated with the end tag 608-16. Instead, the server(s) 112 may determine the endpoint as discussed above, with the end tag 608-16 being used as a rough estimate of the endpoint.

The window tag 608-18 is associated with a window command, such as when the server(s) 112 wants to capture a number of images surrounding a particular moment in time. For example, the server(s) 112 may select a number of images before a timestamp of the command and the same number of images after the timestamp of the command to create a window of video clip data 612-D, centered on the timestamp. Alternatively, the window tag/command may be of a "snapshot" variety, where the window comprises just a single image, where the single image is associated with the timestamp of the command. Thus, the video clip data 612-D may be a single frame or image shown for a duration of time. The single frame may be captured based on the window tag 608-18, such as the timestamp associated with the window tag 608-18, although the present disclosure is not limited thereto. The server(s) 112 may determine the duration of time based on the theme, annotation data, user preferences and/or user input. While FIG. 6A illustrates several examples of tags 608, the disclosure is not limited thereto and the tags 608 may vary. In addition, the server(s) 112 may receive multiple tags 608 of each type and/or tags 608 from multiple users without departing from the disclosure.

To illustrate that the video summarization may include video clips captured on different dates and/or from different image capture devices 110, FIG. 6B illustrates second video data 610-2 including a first portion captured on a first date (e.g., Sep. 15, 2015) and a second portion captured on a second date (e.g., Sep. 24, 2015). The server(s) 112 may generate the video clip data 612 from the second video data 610-2 and may generate the output video data 614 using the video clip data 612.

In some examples, the server(s) 112 may determine candidate video clips and may select a portion of the candidate video clips to include in a video summarization based on similarities between the candidate video clips. Thus, the server(s) 112 may improve a diversity across video clips and avoid having similar video clips included in the video summarization. As illustrated in FIG. 6C, the server(s) 112 may determine candidate video clip data 622 (e.g., video clips A-G) from video data 620 based on annotation data, for example using priority metrics associated with individual video clips. The server(s) 112 may then compare the candidate video clip data 622 using a similarity matrix to identify similar content (e.g., video clips having high affinity with respect to certain attributes/characteristics). For example, the server(s) 112 may determine if two video clips are similar in terms of color characteristics, number of faces, motion data, etc., which may be indicated by the similarity matrix (e.g., a two dimensional array indicating a similarity between the two video clips).

As illustrated in FIG. 6C, the server(s) 112 may group similar video clips as Group 1 (e.g., video clips A-C), Group 2 (e.g., video clips D-E) and Group 3 (e.g., video clips F-G). To improve a diversity across video clips, the server(s) 112 may select a single video clip from each group. In some examples, the server(s) 112 may select the video clip from each group having the highest priority metric for the group. For example, the server(s) 112 may determine selected video clip data 624 including video clip A from Group 1, video clip E from Group 2 and video clip F from Group 3. Therefore, the output video data 626 may include video clips A, E and F.

In some examples, multiple video clips from a first group may have priority metrics exceeding video clips from a second group. For example, video clips A, B and C in Group 1 may each have a priority metric higher than priority metrics associated with video clips D and E in Group 2. When the server(s) 112 selects the selected video clip data 624 using priority metrics alone, the output video data 626 may include video clips A, B and C. However, when the server(s) 112 selects the selected video clip data 624 using priority metrics and similarity matrices, the output video data 626 may exclude video clips B and C due to their similarity to video clip A, despite video clips B and C having higher priority metrics than video clips D and E.

FIG. 7 illustrates an example of a rule engine according to embodiments of the present disclosure. As illustrated in FIG. 7, inputs 700 and rules 702 may be input to a rule engine 704 and the rule engine 704 may generate outputs 706.

The inputs 700 may include video data 710, a trigger 712, parameters 714 and annotation data 716. However, the disclosure is not limited thereto and the inputs 700 may include additional inputs not illustrated in FIG. 7. The video data 710 may include a plurality of video clips or other video data, which may include an aspect ratio greater than 2:1. The trigger 712 may be a command or request that triggered generation of the output data and the rule engine 704 may tailor the output data based on the trigger 712. For example, a video summarization may be triggered by a user request or command, a summary of video data uploaded or captured at a single time, an event, a holiday, a year in review or the like. Based on the trigger 712, the rule engine 704 may select video clips and/or apply rules differently.

The parameters 714 may include desired parameters such as characteristics in the annotation data that may be emphasized in the output data. For example, the parameters 714 may specify a particular person, object, scene or the like represented in the video data to be included in the output data. In some examples, the parameters 714 may be input by a user 10, for example as part of the trigger 712 when the trigger 712 is a command or request input by the user 10. In other examples, the parameters 714 may be determined from the trigger 712, for example for a year in review for a particular user or for an event like a birthday. Additionally or alternatively, the parameters 714 may be determined based on user preferences or other feedback from a user. For example, the server(s) 112 may determine that the user previously preferred stories with a particular theme or including a particular characteristic (e.g., face, object or the like) and the server(s) 112 may use the theme or characteristic to determine the types of outputs. User preferences may include any characteristic included in annotation data, associated with video data and/or associated with outputs, such as a favorite theme, a favorite music track, a desired length for a video summarization or the like. In some examples, the server(s) 112 may determine the user preferences based on previous user ratings input to the server(s) 112. For example, the server(s) 112 may generate a first video summarization and may receive a first user rating indicating a value associated with the first video summarization. Using the user ratings, the server(s) 112 may determine desired characteristics in common between relatively highly rated outputs and/or determine undesired characteristics in common between relatively lower rated outputs.

The annotation data 716 may indicate subjects included in the video data or other characteristics of the video data (hereinafter, subjects and characteristics may be jointly referred to as "characteristics"), such as specific identities, people, faces, objects, pets, locations, landmarks, scenes, etc. represented in the video data or motion data, scene data, audio information, time data, directional data, etc. corresponding to the video data. In some examples, the annotation data may include an annotation database listing individual video frames and associated characteristics, a master clip table listing individual video clips and associated characteristics and/or video tag(s) indicating characteristics corresponding to specific video frame(s).

The rules 702 may be input to the rule engine 704 by a user 10 or by the server(s) 112. For example, the user 10 (e.g., person capturing video data) may generate a rule to apply to future video data and may input the rule to the rule engine 704 to automatically curate subsequently captured video data. Additionally or alternatively, the rule may be generated by a back end user (e.g., person programming the server(s) 112) and may be applied to video data captured by multiple users 10, for example to curate Christmas themed video summarizations for every user 10 uploading video data to the server(s) 112. The rules 702 may include a set of input variables to check, a set of conditions over the input variables and a set of actions to perform when the set of conditions are satisfied, as discussed above with regard to FIG. 1.

The rule engine 704 may extract (720) facts from the annotation data, may evaluate (722) the facts based on a rule, may determine (724) that the facts satisfy conditions of the rule and may select (726) output(s) according to the rule. The outputs 706 of the rule engine 704 may include a theme 730, a video grouping 732 and/or output products 734. Thus, the rule engine 704 may include rules 702 associated with selecting the theme 730 (e.g., applying the theme 730 to video clips satisfying the set of conditions included in the rule), determining the video grouping 732 (e.g., determining how to group video clips) and/or determining the output products 734 (e.g., determining which output products 734 to generate). The theme 730 may be associated with a structure, sequence, layouts, transitions, special effects and/or music that may be applied to video clips included in the output data. The video grouping 732 may be discrete groupings (e.g., Group 1 includes video clips captured during a first range, Group 2 includes video clips captured during a second range, etc.) or may be overlapping groupings (e.g., group the video clips into first groups based on capture data, second groups based on upload data, third groups based on geographic location, etc.) from which the server(s) 112 may select which grouping to apply. The output products 734 may include a video summarization, a video microsummarization, an image extracted from a video clip, a photo album of images extracted from video clips, a photo collage, a time lapse or the like.

Figure 8:
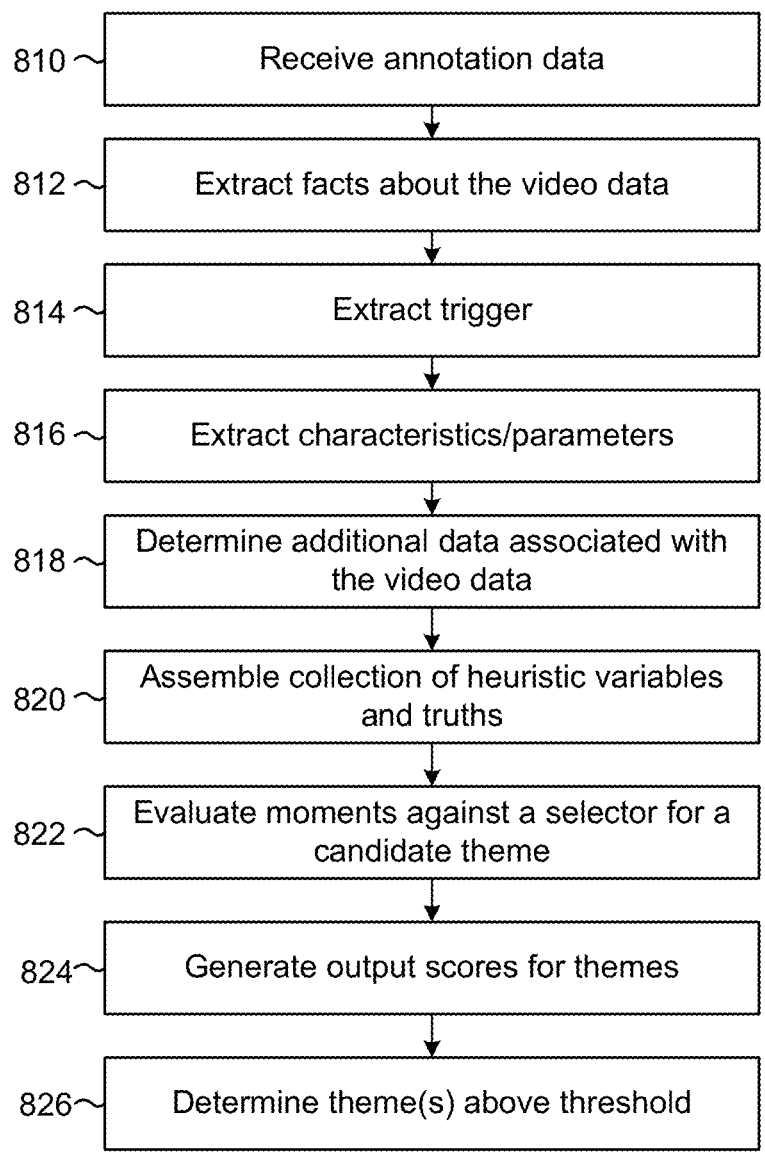
FIG. 8 is a flowchart conceptually illustrating an example method for determining a theme according to embodiments of the present disclosure.

FIG. 8 is a flowchart conceptually illustrating an example method for determining a theme according to embodiments of the present disclosure. As discussed above, the theme may be determined based on the video data and/or the annotation data, and may indicate structures, layouts, transitions, special effects and/or music to apply to the output data (e.g., video summarization) or candidate structures, layouts, transitions, special effects and/or music from which to select for the output data.

For example, the server(s) 112 may apply transitions, special effects and music to video clips included in a video summarization. Thus, the selected theme may be associated with certain transitions, special effects, music tracks or the like and the server(s) 112 may apply the transitions, special effects, music tracks or the like to some or all of the video clips included in the video summarization. The transitions may indicate how the video summarization transitions from a first video clip to a second video clip, such a cut, a fade, a slide, an animation zooming/panning within a video clip, or other transitions. In some examples, more complicated transitions may be used, such as transitioning from a first layout including two video clips and a second layout including three video clips. For example, the transition may include the two video clips in the first layout moving upwards as they are replaced by two new video clips and a third video clip slides into position below in the second layout.

The server(s) 112 may apply special effects based on the theme, such as scripted sequences, geometric shapes, color overlays, texture, vignette, film scratches, desaturation, black and white, flash bulb effect or the like. Thus, the server(s) 112 may apply one or more special effects associated with the selected theme to some or all of the video clips. For example, some of the special effects may be applied globally across the video summarization, whereas the server(s) 112 may apply a first special effect (e.g., vignette and film scratches) to a first video clip and a second special effect (e.g., flash bulb effect) to a second video clip in order to add variety to the video summarization.

As illustrated in FIG. 8, the server(s) 112 may receive (810) annotation data and extract (812) facts about the video data from the annotation data. The server(s) 112 may extract (814) a trigger for generating output data, extract (816) characteristics/parameters associated with the output data and determine (818) additional data associated with the video data. For example, the characteristics/parameters may be input by a user 10 (e.g., the user 10 may select characteristics to include in the output data) or determined based on the trigger for the output data (e.g., a group of video clips were uploaded at one time, prompting the server(s) 112 to trigger the generating of output data; the characteristics/parameters may be associated with a year in review, a video summarization, a birthday or the like). The additional data may include dates of holidays, events, sports scores or the like that may be relevant to the video data. In some examples, the additional data may be stored in the annotation database as part of the annotation data, although the disclosure is not limited thereto.

In some examples, the facts extracted from the annotation data may include information about a scene (e.g., indoors, outdoors, sports arena, etc.), whether the video clip represents individuals or a group of people, heuristics about motion (e.g., fast moving scene, slow moving scene, camera in motion, people in motion, etc.), object annotation and/or specific object detection (e.g., birthday cake, balloons, Christmas tree, Christmas lights, presents, etc.), although the disclosure is not limited thereto. In some examples the trigger for video summarization may include year in review, holiday, birthday, event, based on the user 10 uploading a number of videos at the same time, based on the user 10 uploading a number of videos captured on the same day or within a period of time, based on the user 10 uploading a number of vides within geographical proximity, or the like.

In some examples, the additional data may include a title input by the user 10 for a video summarization, which may be processed using natural language understanding to extract characteristics associated with the title. Additionally or alternatively, the additional data may include cross-user data extracted from other users. For example, the server(s) 112 may generate video "fingerprints" that indicate characteristics of a video clip that may be used to identify similar video clips without compromising user privacy or confidentiality. The characteristics of the video clip may include feature vectors, histograms of image data, gradients of the image data, histograms of gradients, a signature of the image data or the like that may be used to determine if image data is similar between video clips. Using the video fingerprints, the server(s) 112 may identify similar video data uploaded by other users representing an event (e.g., a number of videos uploaded after the Olympics, a sporting event, a concert or the like). Due to the similarity between the video data, the server(s) 112 may borrow characteristics of manually selected summarization and automatically transfer manual selections from other users to generate the video summarization.

The server(s) 112 may assemble (820) a collection of heuristic variables and truths and evaluate (822) moments against a selector for a candidate theme. Thus, each moment has a certain set of attributes that may be compared to candidate themes in order to select the appropriate theme. For example, the server(s) 112 may determine that a moment includes movement, such as a changing geographic location, prominently represents a face, includes motion above a threshold and represents a specific object such as a road or road signs. As a result, the server(s) 112 may determine a likely candidate theme to be a Road Trip theme. The server(s) 112 may generate (824) output scores for candidate themes and determine (826) theme(s) having an output score exceeding a threshold. In some examples, the server(s) 112 may output a desired number of themes (e.g., top three scoring themes), or may output themes with a score greater than a threshold. The server(s) 112 may generate multiple types of output data or may store the themes for user feedback after generating a single type of output data (e.g., video summarization).

Thus, the server(s) 112 may analyze the annotation data to select a series of output theme(s) based on the received video data and/or annotation data. For example, the server(s) 112 may scan the master clip table (MCT) to extract facts about the video clips and assemble a collection of heuristic variables and truths. The server(s) 112 may use a rule management system to evaluate each moment against a selector for a candidate theme.

In some examples, the server(s) 112 may apply a rule and select a theme if the set of conditions associated with the rule are satisfied. In other examples, the server(s) 112 may send the output scores from the themes into another scorecard to make a decision (e.g., thresholding). For example, if the video data included video clips of children opening packages and a Christmas tree, the server(s) 112 may identify multiple candidate themes and an output score for each. By ranking the output scores, the server(s) 112 may determine that the highest scoring theme is "Holidays" from the candidate themes and may apply the "Holidays" theme to the selected video clips. Additionally or alternatively, after determining characteristics of the video data (e.g., every clip included in the video data) to determine a theme, the server(s) 112 may select individual video clips using the selected theme. Thus, the server(s) 112 may apply one or more themes depending on the rules and/or if thresholding is used to select a highest scoring theme from the candidate themes.

The server(s) 112 may determine the theme based on annotation data such as scenes (e.g., indoor, outdoor, sports arena, etc.), number of people (e.g., individual or group of individuals), motion data (e.g., fast moving scene, slow moving scene, motion associated with the image capture device, etc.), specific object detection (e.g., birthday cake, balloons, etc.) or the like. For example, the specific object detection may identify specific objects associated with a birthday party (e.g., birthday cake, gifts, balloons, etc.), with a wedding (e.g., wedding cake, wedding dress, formal attire, etc.), a sporting event (e.g., sports arena, uniforms, etc.), a road trip (e.g., components of a vehicle, roads, etc.) or the like. The theme may be associated with a structure (e.g., sequence of video clips), layouts (e.g., number of video clips visible in a video frame), transitions (e.g., swipe, translate, slide, fade, etc.) between video clips/layouts, special effects (e.g., vignette, film scratches, flash bulb effect, etc.), scripted sequences (e.g., specific order of layouts), pacing (e.g., cadence of transitions, the video clips or audio data) and/or audio (e.g., music tracks corresponding to the video clips). For example, the server(s) 112 may apply an old black and white theme using a vignette, film scratches, desaturating to black and white, flash bulb effects and other special effects.

Figure 9:
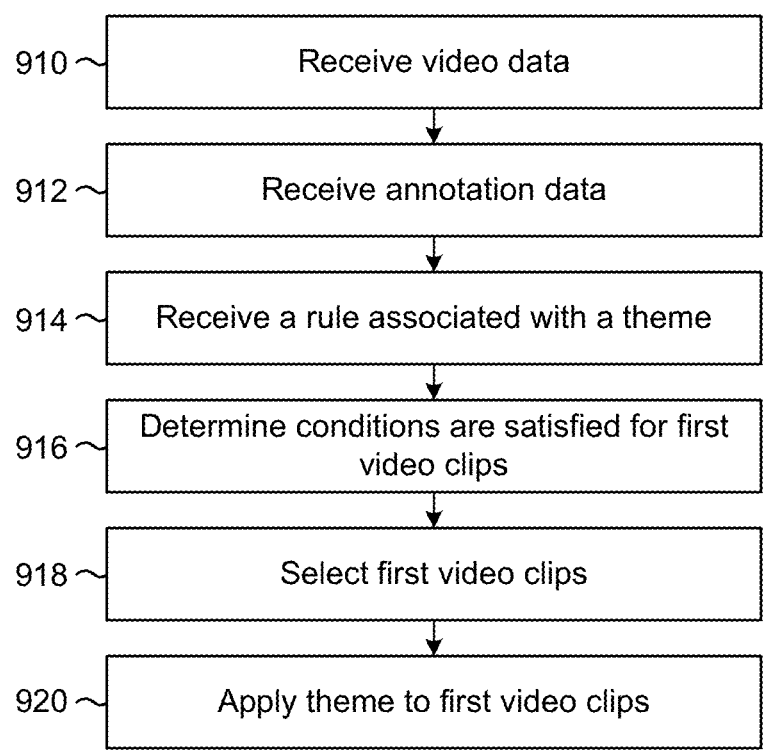
FIG. 9 is a flowchart conceptually illustrating an example method for applying a theme according to embodiments of the present disclosure.

In some examples, the server(s) 112 may select video clips that satisfy the set of conditions associated with a rule. FIG. 9 is a flowchart conceptually illustrating an example method for applying a theme according to embodiments of the present disclosure. As illustrated in FIG. 9, the server(s) 112 may receive (910) video data, receive (912) annotation data and receive (914) a rule associated with a theme. The rule may include a set of input variables to check, a set of conditions over the input variables and a set of actions to perform when the set of conditions are satisfied. The server(s) 112 may determine (916) that the set of conditions are satisfied for first video clips (e.g., a portion of the video data) using the annotation data. The server(s) 112 may select (918) the first video clips and apply (920) the theme to the first video clips. For example, if the output data is a video summarization, the server(s) 112 may apply the theme to the first video clips in the video summarization.

While FIG. 9 illustrates selecting video clips that satisfy the set of conditions associated with a rule, the present disclosure is not limited thereto. Instead, the server(s) 112 may group video clips based on the annotation data and may determine if the rule applies to each group of video clips. For example, the server(s) 112 may group the video data into two or more groups based on capture data, upload date, geographic location and/or characteristics represented in the video data and may determine if individual groups satisfy one or more rules. FIGS. 10A-10C illustrate examples of grouping video clips according to embodiments of the present disclosure.

FIG. 10A illustrates the server(s) 112 grouping video data based on a capture date. As illustrated in FIG. 10A, a capture date timeline 1010 represents respective capture dates for video clip data 1012, with video clip A being captured first and video clip G being captured last. The server(s) may group the video clip data 1012 into three groups based on the capture date. For example, video clips A-C were captured within a short duration of time (e.g., difference in capture date is below a threshold), video clips D-E were captured within a short duration of time and video clips F-G were captured within a short duration of time, but there are gaps between video clips C-D and video clips E-F (e.g., difference in capture date is above a threshold). Therefore, the server(s) 112 may associate video clips A-C with Group 1, video clips D-E with Group 2 and video clips F-G with Group 3. The server(s) 112 may determine if individual groups (or video clips in the individual groups) satisfy a rule and may select the individual groups accordingly.

FIG. 10B illustrates the server(s) 112 grouping video data based on an upload date. As illustrated in FIG. 10B, an upload date timeline 1020 represents respective upload dates for the video clip data 1012, with video clips A-B being uploaded first and video clip G being uploaded last. The server(s) 112 may group the video clip data 1012 into three groups based on the upload date. For example, video clips A-B were uploaded at the same time, video clips D-E were uploaded within a short duration of time (e.g., difference in upload date is below a threshold) and video clips F-G were uploaded within a short duration of time, but there are gaps between video clips B-C and video clips E-F (e.g., difference in upload date is above a threshold). Therefore, the server(s) 112 may associate video clips A-B with Group 1, video clips C-E with Group 2 and video clips F-G with Group 3. The server(s) 112 may determine if individual groups (or video clips in the individual groups) satisfy a rule and may select the individual groups accordingly.

FIG. 10C illustrates the server(s) 112 grouping video data based on a capture location (e.g., geographic location such as Global Positioning System (GPS) coordinates or the like). As illustrated in FIG. 10C, locations of video clips 1030 are shown on a map 1032 representing New England. For example, a first grouping of video clips are illustrated in Rhode Island, a second grouping of video clips are illustrated near Boston, a third grouping of video clips are illustrated in New Hampshire and individual video clips are illustrated in Maine and Cape Cod. As illustrated in FIG. 10C, the server(s) 112 may group the video clips based on proximity in geographic location (e.g., distance is below a threshold). For example, the server(s) 112 may differentiate video clips associated with New Hampshire 1040, Maine 1042, Boston 1044, Rhode Island 1046 and Cape Cod 1048. While Cape Cod and Boston are both located in Massachusetts, the server(s) 112 may distinguish the grouping in Boston from the isolated video clips in Cape Cod based on the geographic location (e.g., distance exceeds a threshold) instead of grouping the video clips together due to the common location name (e.g., Massachusetts) for both. Thus, the server(s) 112 may determine that the video clips associated with Cape Cod 1048 are separate from the video clips associated with Boston 1044 as the geographic locations exceed a threshold.

While FIGS. 10A-10C illustrate several examples of grouping the video data, the disclosure is not limited thereto and the server(s) 112 may group the video data using any characteristic included in the annotation data or associated with the video data. For example, the server(s) 112 may group video data based on a single characteristic, such as a face represented in portions of the video data (e.g., selecting video clips including a user, the user's daughter, or the like). Additionally or alternatively, the server(s) 112 may group video data based on multiple characteristics, such as multiple faces represented in the portions of the video data (e.g., selecting video clips including the user and the user's daughter) or a face and an object/scene type (e.g., selecting video clips including the user skiing, coaching softball, by a beach or the like). Therefore, the server(s) 112 may group the video data based on a content of the video data. A non-exclusive list of examples of content includes certain events (e.g., first birthday party, Christmas morning, an individual concert, an individual sporting event or the like), types of events (e.g., parties, concerts, sporting events, family events or the like), types of scenes (e.g., indoor, outdoor, outdoor in sunlight, outdoor in winter, outdoor at a beach or the like), individual objects (e.g., user's face, family members, pets, vehicles, garden or the like), groups of people (e.g., immediate family, first side of extended family, second side of extended family, coworkers or the like) or other content-based data.

Figure 11:
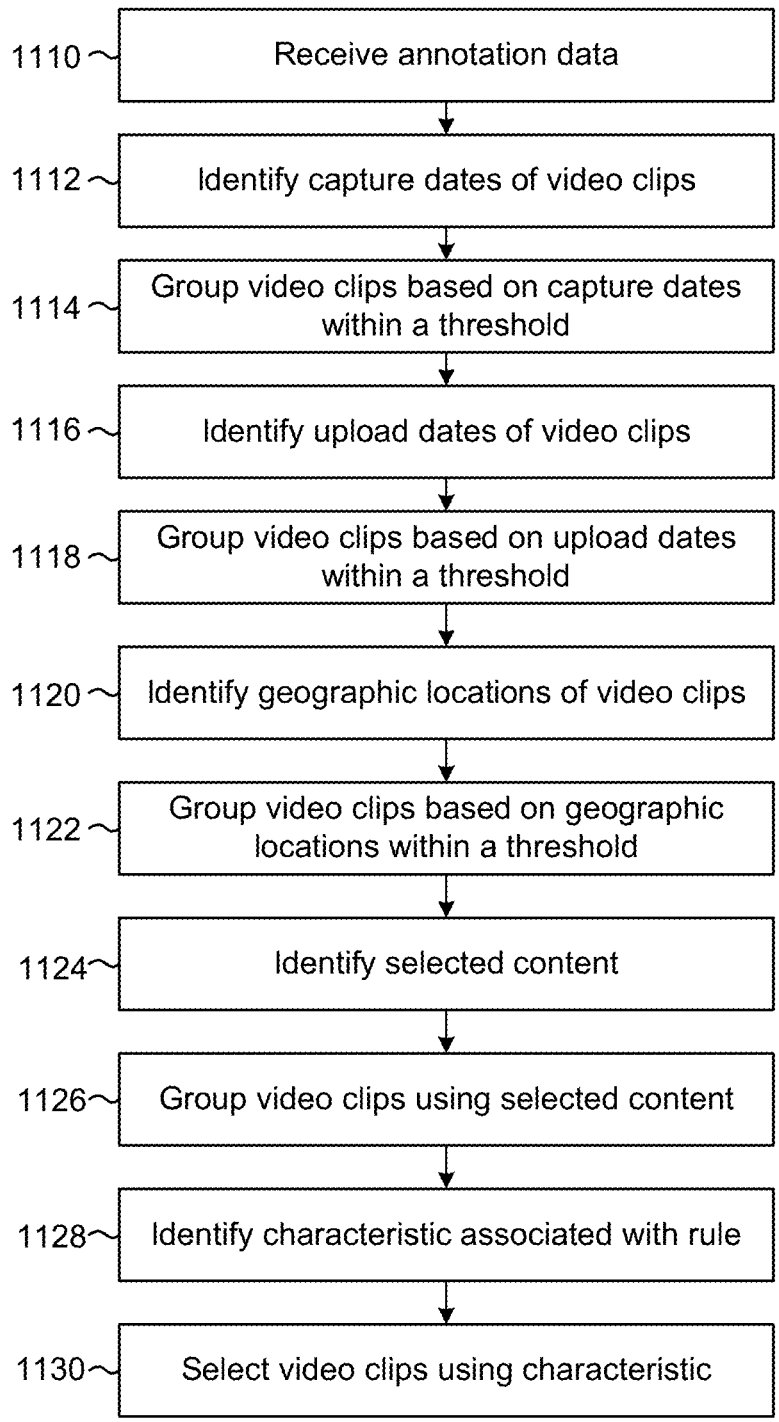
FIG. 11 is a flowchart conceptually illustrating an example method for grouping video clips according to embodiments of the present disclosure.

FIG. 11 is a flowchart conceptually illustrating an example method for grouping video clips according to embodiments of the present disclosure. As illustrated in FIG. 11, the server(s) 112 may receive (1110) annotation data, identify (1112) capture dates of video clips and group (1114) video clips based on capture dates within a threshold. The server(s) 112 may identify (1116) upload dates of video clips and group (1118) the video clips based on upload dates within a threshold. The server(s) 112 may identify (1120) geographic locations of video clips and may group (1122) video clips based on geographic locations within a threshold. The server(s) 112 may identify (1124) selected content and may group (1126) video clips using the selected content. For example, the selected content may be input by a user or may be determined based on previous output generated by the user. Additionally or alternatively, the server(s) 112 may identify (1128) a characteristic associated with a rule and may select (1130) a video clips using the characteristic. The characteristic may be associated with objects or people represented in the video data (e.g., video clips including Person A), motion data (e.g., video clips having motion data exceeding a threshold), scene type (e.g., indoor or outdoor scene) or any other characteristic stored in the annotation data. For example, a rule for a skiing output may be associated with a characteristic (e.g., mountain covered with snow, skis and/or ski lift represented in the video data) and the server(s) 112 may select video clips that include the characteristic based on annotation data. As another example, a rule for a birthday party output may be associated with a characteristic (e.g., gifts, birthday cake and/or birthday candles represented in the video data, a capture date corresponding to a birthday or the like) and the server(s) 112 may select the video clips that include the characteristic based on the annotation data.

Figure 12:
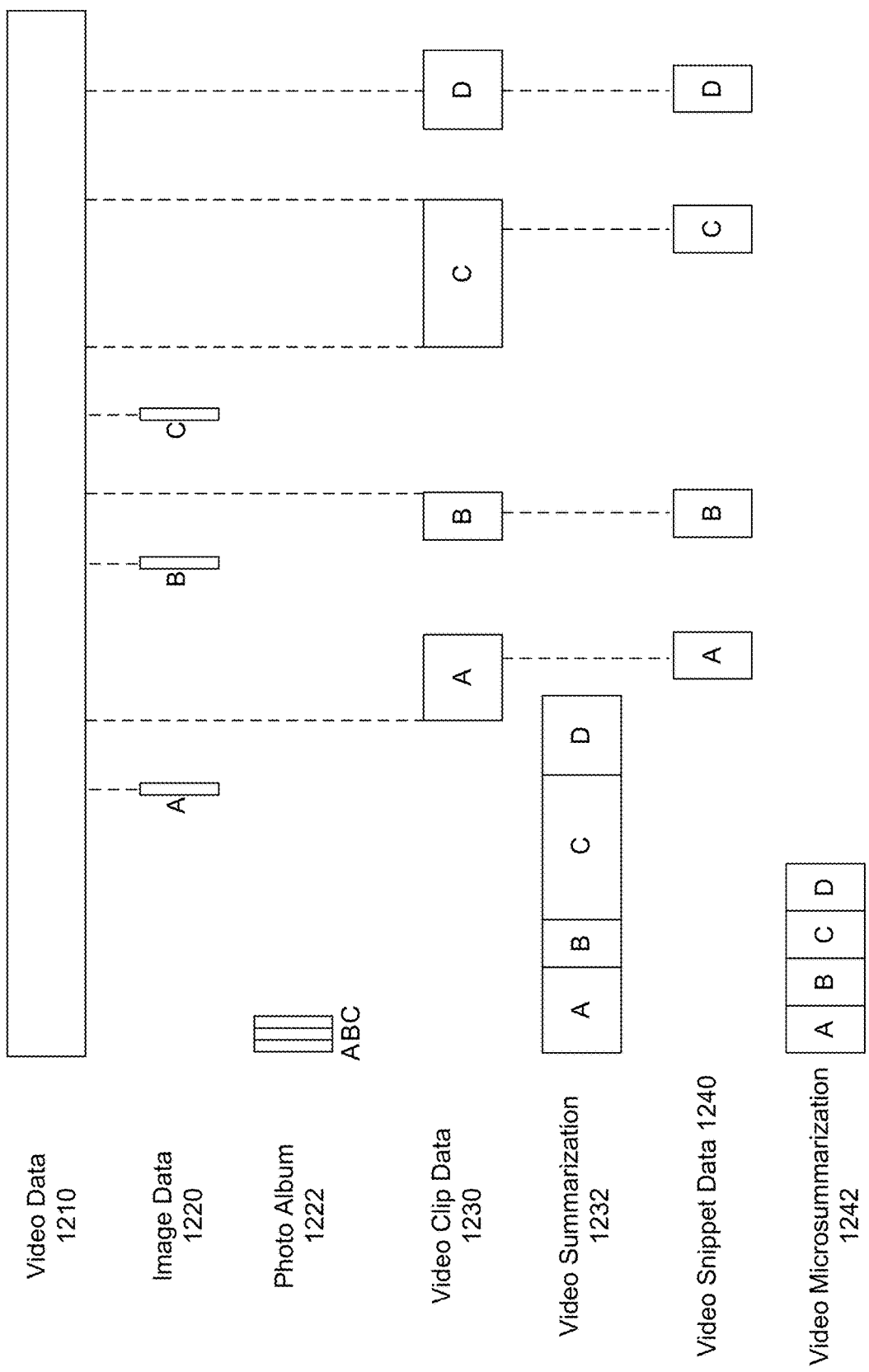
FIG. 12 illustrates an example of types of outputs according to embodiments of the present disclosure.

FIG. 12 illustrates an example of types of output data according to embodiments of the present disclosure. As illustrated in FIG. 12, video data 1210 may be used to generate image data 1220 (e.g., individual video frames that capture a moment), a photo album 1222 (e.g., two or more video frames), video clip data 1230 (e.g., video clips that capture a moment), video summarization 1232 (e.g., a summarization of the video data 1210 including the video clip data 1230), video snippet data 1240 (e.g., video snippets that capture a moment in a certain duration of time, such as 2 seconds or less) and/or video microsummarization 1242 (e.g., a summarization of the video data 1210 including the video snippet data 1240, the video microsummarization 1242 having a duration of time less than a threshold, such as 6 seconds, 10 seconds or 15 seconds). The server(s) 112 may generate one or more of the different types of output data based on a rule and/or for a selected theme. For example, the server(s) 112 may generate individual video frames, a photo album and a video summarization for a selected theme and/or in response to a rule. The server(s) 112 may provide each of the generated types of output data to the user 10 and the user 10 may select one or more of the generated types of output data to save, send, modify or delete.

While FIG. 12 illustrates the video clip data 1230 including discrete portions of the video data 1210, the disclosure is not limited thereto. Instead, the video clip data 1230 may include overlapping portions of the video data 1210 without departing from the disclosure. In some examples, the server(s) 112 may generate multiple video summarizations 1232 including different video clip data 1230 for each video summarization 1232. For example, a first video summarization 1232*a* may include video clips A, B and C whereas a second video summarization 1232*b* may include video clips A, C and D. As discussed above, the server(s) 112 may generate multiple types of outputs and therefore portions of the video data 1210 may be included in multiple outputs having different themes and/or groupings. For example, the first video summarization 1232*a* may be generated using a winter theme whereas the second video summarization 1232*b* may be generated using a Christmas theme, resulting in two distinct outputs despite the similarity in video clips.

While FIG. 12 illustrates the image data 1220 being generated from the video data 1210, the disclosure is not limited thereto. Instead, the server(s) 112 may receive image data captured by an image capture device that is not associated with the video data 1210. Similarly, the server(s) 112 may receive audio data captured by an audio capture device that is not associated with the video data 1210. Therefore, the server(s) 112 may generate outputs including image data, video data, audio data and/or other types of data received by the server(s) 112. Additionally or alternatively, the image data 1220 may be included in the video summarization 1232 and/or video microsummarization 1242 without departing from the disclosure.

The server(s) 112 may select various combinations of themes, video clips and/or types of output data and may therefore offer a number of distinct output data to the user 10. For example, the server(s) 112 may select three themes associated with the video data 1210, may select five different groups of video clip data 1230 and may generate six different types of output data. Thus, the server(s) 112 may generate output data associated with each of the three themes for each of the five different groups using any of the six different types of output data. For example, the server(s) 112 may select a Holiday theme, may determine that four groups satisfy the conditions of the Holiday theme and may generate output data for each of the four groups using the Holiday theme, resulting in four sets of output data, each set associated with different portions of the video data 1210.

Figure 13:
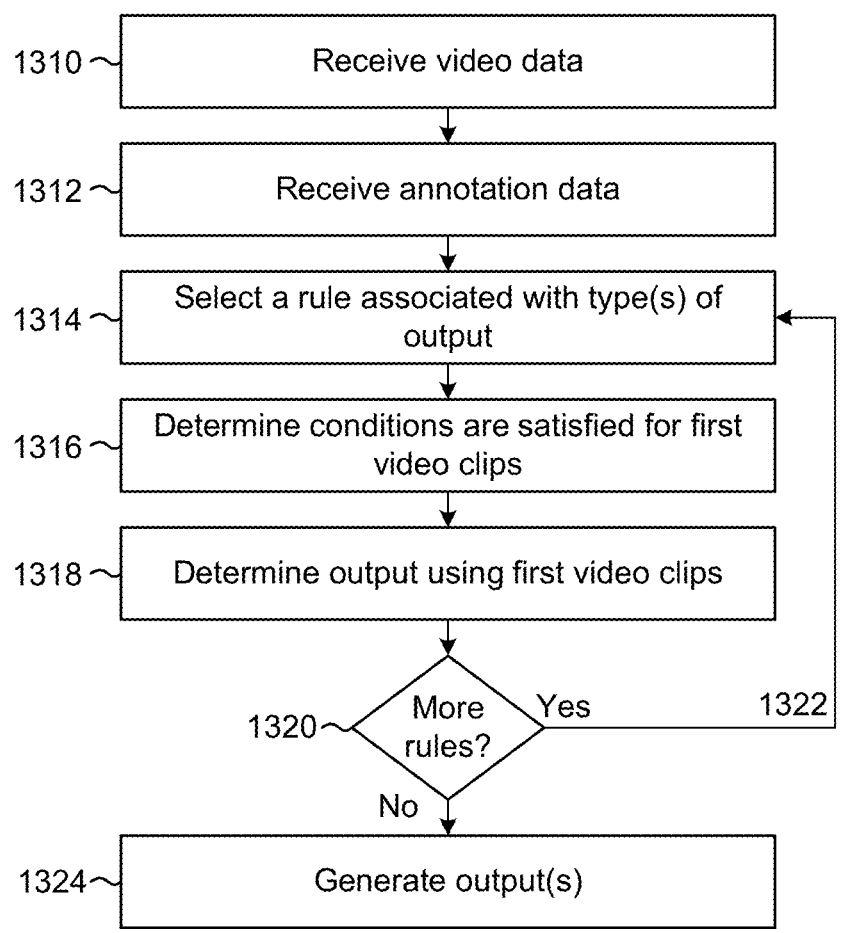
FIG. 13 is a flowchart conceptually illustrating an example method for determining types of output data according to embodiments of the present disclosure.

FIG. 13 is a flowchart conceptually illustrating an example method for determining types of output data according to embodiments of the present disclosure. As illustrated in FIG. 13, the server(s) 112 may receive (1310) video data and receive (1312) annotation data associated with the video data. The server(s) 112 may select (1314) a rule associated with type(s) of output, may determine (1316) conditions are satisfied for first video clips and may determine (1318) an output (indicated by the rule) using the first video clips. The server(s) 112 may determine (1320) if there are more rules and if so, may loop (1322) to step 1314 and repeat steps 1314-1318 for the next rule. If there are no more rules, the server(s) 112 may generate (1324) output(s) determined in step 1318.

Figure 14:
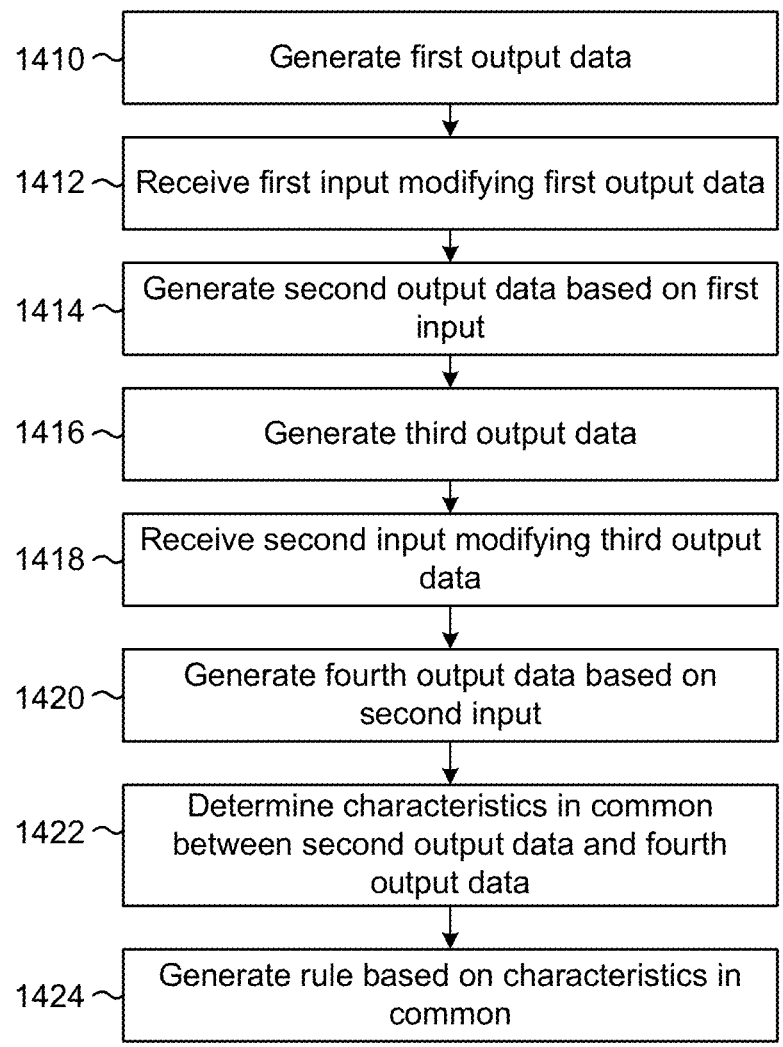
FIG. 14 is a flowchart conceptually illustrating an example method for generating a rule based on input according to embodiments of the present disclosure.

FIG. 14 is a flowchart conceptually illustrating an example method for generating a rule based on input according to embodiments of the present disclosure. As illustrated in FIG. 14, the server(s) 112 may generate (1410) first output data, may receive (1412) first input modifying the first output data and may generate (1414) second output data based on the input. For example, the server(s) 112 may generate a first video summarization using first video data, receive input (e.g., from the user 10) modifying the first video summarization and may generate a second video summarization based on the input.

The server(s) 112 may generate (1416) third output data, receive (1418) second input modifying the third output data and may generate (1420) fourth output data based on the second input. For example, the server(s) 112 may generate a third video summarization using second video data, receive input modifying the third video summarization and may generate a fourth video summarization based on the input.

The server(s) 112 may determine (1422) characteristics in common between the second output data and the fourth output data and may generate (1424) a rule based on the characteristics in common. Thus, the server(s) 112 may determine characteristics in common between the second video summarization and the fourth video summarization and may generate a new rule. For example, the first input and the second input may select the same theme for the second video summarization and the fourth video summarization, so the server(s) 112 may identify characteristics shared between the second video summarization and the fourth video summarization and may associate the shared characteristics with the theme. Therefore, the server(s) 112 may generate a new rule including a set of conditions based on the shared characteristics and may apply the theme when the set of conditions are satisfied. As a result, the server(s) 112 may adapt based on input from the user 10 and may generate rules that will select themes, groupings and/or types of output data desired by the user 10.

While FIG. 14 illustrates an example of generating rules based on user preferences learned via feedback (e.g., user input modifying a video summarization), the disclosure is not limited thereto and the server(s) 112 may determine user preferences using any techniques known to one of skill in the art. Instead, the server(s) 112 may determine user preferences associated with other types of output (e.g., photo album, image data, photo collage, time lapse, etc.). Additionally or alternatively, the server(s) 112 may determine user preferences and/or generate rules based on other inputs. For example, the server(s) 112 may learn the user preferences and/or generate rules based on video data associated with the user, viewed by the user or the like. In some examples, the server(s) 112 may determine global preferences and/or generate global rules that are applied to multiple users and are not specific to a user of the device. For example, the server(s) 112 may collate feedback from multiple users modifying a plurality of video summarizations (or other types of output) and may generate rules based on the collated feedback.

Figure 15:
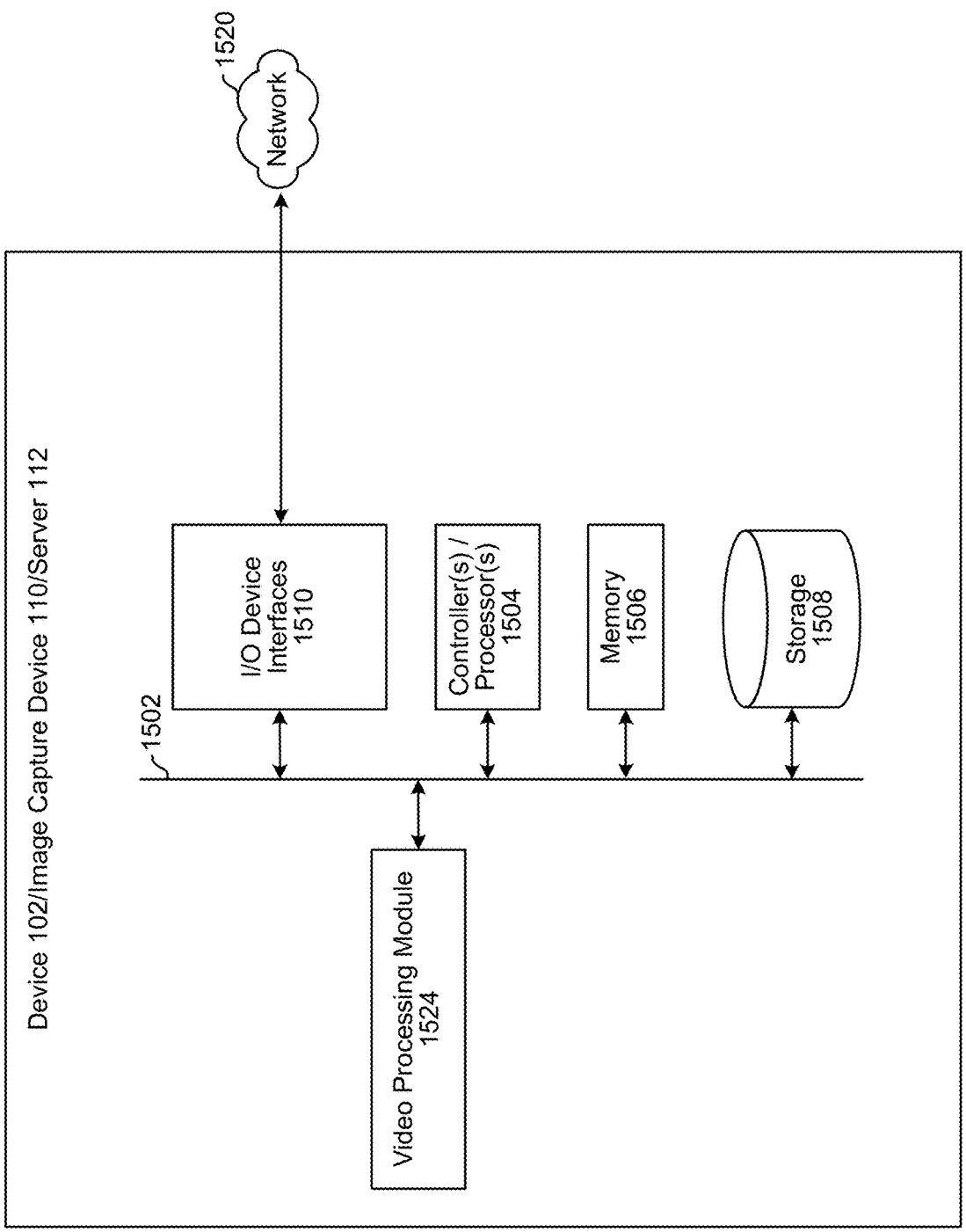
FIG. 15 is a block diagram conceptually illustrating example components of a system according to embodiments of the present disclosure.

FIG. 15 illustrates a block diagram conceptually illustrating example components of a system 100 including one or more of a device 102, an image capture device 110 and/or a server(s) 112. Depending upon how the system is structured, some of the components illustrated in FIG. 15 as part of the device 102, the image capture device 110 or the server(s) 112 may be included only in the device 102, the image capture device 110 or in the server(s) 112, or may be distributed across multiple devices 102, image capture devices 110 and/or servers 112. Other components not illustrated may also be included in the device 102, the image capture device 110 and/or the server(s) 112. In operation, the system 100 may include computer-readable and computer-executable instructions that reside in storage 1508 on the device 102/image capture device 110/server(s) 112. The device 102/image capture device 110/server(s) 112 may be an electronic device capable of performing video processing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/image capture device 110/server(s) 112 may also be a component of any of the abovementioned devices or systems.

As illustrated in FIG. 15, the device 102/image capture device 110/server(s) 112 may include an address/data bus 1502 for conveying data among components of the device 102/image capture device 110/server(s) 112. Each component within the device 102/image capture device 110/server(s) 112 may also be directly connected to other components in addition to (or instead of) being connected to other components across the bus 1502.

The device 102/image capture device 110/server(s) 112 may include one or more controllers/processors 1504 comprising one-or-more central processing units (CPUs) for processing data and computer-readable instructions and a memory 1506 for storing data and instructions. The memory 1506 may include volatile random access memory (RAM), non-volatile read only memory (ROM), non-volatile magnetoresistive (MRAM) and/or other types of memory. The device 102/image capture device 110/server(s) 112 may also include a data storage component 1508 for storing data and processor-executable instructions. The data storage component 1508 may include one or more non-volatile storage types such as magnetic storage, optical storage, solid-state storage, etc. The device 102/image capture device 110/server(s) 112 may also be connected to a removable or external non-volatile memory and/or storage (such as a removable memory card, memory key drive, networked storage, etc.) through the input/output device interfaces 1510.

The device 102/image capture device 110/server(s) 112 includes input/output device interfaces 1510. A variety of components may be connected to the device 102/image capture device 110/server(s) 112 through the input/output device interfaces 1510, such as camera(s) 115 and microphone(s) 116. However, the disclosure is not limited thereto and the device 102/image capture device 110/server(s) 112 may not include an integrated camera or microphone. Thus, the camera(s) 115, microphone(s) 116 and/or other components may be integrated into the device 102/image capture device 110/server(s) 112 or may be separate without departing from the disclosure. In some examples, the image capture device 110 may include an inertial measurement unit (IMU), gyroscope, accelerometers or other component configured to provide motion data or the like associated with the image capture device 110.

The input/output device interfaces 1510 may be configured to operate with a network 1520, for example a wireless local area network (WLAN) (such as WiFi), Bluetooth, ZigBee and/or wireless networks, such as a Long Term Evolution (LTE) network, WiMAX network, 3G network, etc. The network 1520 may include a local or private network or may include a wide network such as the internet. Devices may be connected to the network 1520 through either wired or wireless connections.

The input/output device interfaces 1510 may also include an interface for an external peripheral device connection such as universal serial bus (USB), FireWire, Thunderbolt, Ethernet port or other connection protocol that may connect to networks 1520. The input/output device interfaces 1510 may also include a connection to an antenna (not shown) to connect one or more networks 1520 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/image capture device 110/server(s) 112 further includes a video processing module 1524, which may comprise processor-executable instructions stored in storage 1508 to be executed by controller(s)/processor(s) 1504 (e.g., software, firmware), hardware, or some combination thereof. For example, components of the video processing module 1524 may be part of a software application running in the foreground and/or background on the device 102/image capture device 110/server(s) 112. The video processing module 1524 may control the device 102/image capture device 110/server(s) 112 as discussed above, for example with regard to FIGS. 1, 8, 9, 11, 13 and/or 14. Some or all of the controllers/modules of the video processing module 1524 may be executable instructions that may be embedded in hardware or firmware in addition to, or instead of, software. In one embodiment, the device 102/image capture device 110/server(s) 112 may operate using an Android® operating system (such as Android 4.3 Jelly Bean, Android 4.4 KitKat or the like), an Amazon operating system (such as FireOS or the like), or any other suitable operating system.

Executable computer instructions for operating the device 102/image capture device 110/server(s) 112 and its various components may be executed by the controller(s)/processor(s) 1504, using the memory 1506 as temporary "working" storage at runtime. The executable instructions may be stored in a non-transitory manner in non-volatile memory 1506, storage 1508, or an external device. Alternatively, some or all of the executable instructions may be embedded in hardware or firmware in addition to or instead of software.

The components of the device(s) 102/image capture device 110/server(s) 112, as illustrated in FIG. 15, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 16:
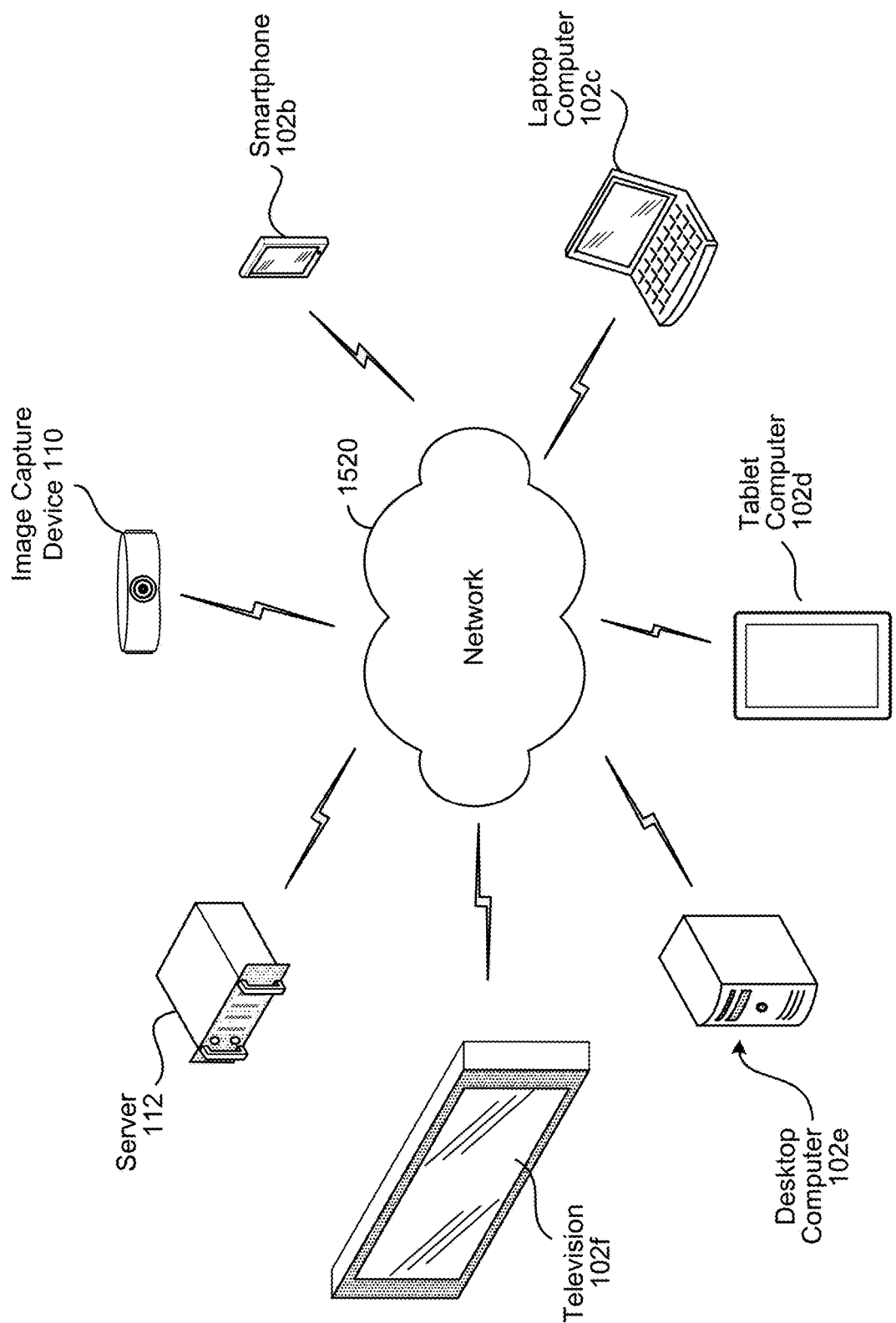
FIG. 16 illustrates an example of a computer network for use with the system.

As shown in FIG. 16, multiple devices may be connected over a network 1520. The network 1520 may include a local or private network or may include a wide network such as the internet. Devices may be connected to the network 1520 through either wired or wireless connections. For example, a smart phone 102b may be connected to the network 1520 through a wireless service provider. Other devices, such as an image capture device 110, laptop computer 102c, tablet computer 102d, desktop computer 102e, television 102f, and/or server(s) 112, may connect to the network 1520 through a wired connection. The server(s) 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server(s) 112 may perform any of the steps described above with regard to FIGS. 1, 8, 9, 11, 13 and/or 14. Alternatively, the server(s) 112 may receive and store data generated by the image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server(s) 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving first input video data;
receiving first annotation data associated with the first input video data, the first annotation data indicating that a characteristic is represented in the first input video data;
determining, based at least in part on the first annotation data indicating that the characteristic is represented in the first input video data, that the first annotation data corresponds to a theme;

receiving second input video data;
receiving second annotation data associated with the second input video data, the second annotation data indicating that the characteristic is represented in the second input video data;
determining, based at least in part on the second annotation data indicating that the characteristic is represented in the second input video data, that the second annotation data corresponds to the theme; and
based at least in part on the first annotation data and the second annotation data corresponding to the theme, generating a video summarization corresponding to the theme using the first input video data and the second input video data.

2. The computer-implemented method of claim 1, wherein:
the theme corresponds to a location; and
determining the first annotation data corresponds to the theme comprises determining the first annotation data indicates that the first input video data corresponds to the location.

3. The computer-implemented method of claim 2, further comprising:
determining a landmark is represented in the second input video data, the landmark associated with the location.

4. The computer-implemented method of claim 1, further comprising:
receiving first data representing a first condition associated with video summarization generation; and
determining that the first annotation data indicates that the first input video data corresponds to the first condition.

5. The computer-implemented method of claim 4, further comprising:
receiving second data representing a second condition associated with video summarization generation, wherein the second condition is different from the first condition; and
determining that the second annotation data indicates that the second input video data corresponds to the second condition.

6. The computer-implemented method of claim 1, wherein:
the first annotation data includes data representing output of speech processing performed using audio data corresponding to the first input video data.

7. The computer-implemented method of claim 1, wherein:
the first annotation data includes data representing at least one face detected in the first input video data.

8. The computer-implemented method of claim 1, wherein the first input video data was captured by a first camera and the second input video data was captured by a second camera different from the first camera.

9. The computer-implemented method of claim 1, further comprising:
receiving a portion of the first input video data; and
determining, using the first annotation data, that the portion of the first input video data does not correspond to the theme, wherein the video summarization does not include the portion of the first input video data.

10. The computer-implemented method of claim 1, further comprising:
generating an output score for the theme; and
based at least in part on the output score for the theme, selecting the theme from a plurality of candidate themes.

11. A system, comprising:
at least one processor; and
at least one memory comprising instructions that, when executed by the at least one processor, cause the system to:
receive first input video data;
receive first annotation data associated with the first input video data, the first annotation data indicating that a characteristic is represented in the first input video data;
determine, based at least in part on the first annotation data indicating that the characteristic is represented in the first input video data, that the first annotation data corresponds to a theme;
receive second input video data;
receive second annotation data associated with the second input video data, the second annotation data indicating that the characteristic is represented in the second input video data;
determine, based at least in part on the second annotation data indicating that the characteristic is represented in the second input video data, that the second annotation data corresponds to the theme; and
based at least in part on the first annotation data and the second annotation data corresponding to the theme, generate a video summarization corresponding to the theme using the first input video data and the second input video data.

12. The system of claim 11, wherein:
the theme corresponds to a location; and
the instructions that cause the system to determine the first annotation data corresponds to the theme comprise instructions that, when executed by the at least one processor, further cause the system to determine the first annotation data indicates that the first input video data corresponds to the location.

13. The system of claim 12, wherein the at least one memory further comprises instructions that, when executed by the at least one processor, further cause the system to:
determine a landmark is represented in the second input video data, the landmark associated with the location.

14. The system of claim 12, wherein the at least one memory further comprises instructions that, when executed by the at least one processor, further cause the system to:
receive first data representing a first condition associated with video summarization generation; and
determine that the first annotation data indicates that the first input video data corresponds to the first condition.

15. The system of claim 14, wherein the at least one memory further comprises instructions that, when executed by the at least one processor, further cause the system to:
receive second data representing a second condition associated with video summarization generation, wherein the second condition is different from the first condition; and
determine that the second annotation data indicates that the second input video data corresponds to the second condition.

16. The system of claim 11, wherein:
the first annotation data includes data representing output of speech processing performed using audio data corresponding to the first input video data.

17. The system of claim 11, wherein:
the first annotation data includes data representing at least one face detected in the first input video data.

18. The system of claim 11, wherein the first input video data was captured by a first camera and the second input video data was captured by a second camera different from the first camera.

19. The system of claim 11, wherein the at least one memory further comprises instructions that, when executed by the at least one processor, further cause the system to:
   receive a portion of the first input video data; and
   determine, using the first annotation data, that the portion of the first input video data does not correspond to the theme,
   wherein the video summarization does not include the portion of the first input video data.

20. The system of claim 11, wherein the at least one memory further comprises instructions that, when executed by the at least one processor, further cause the system to:
   generate an output score for the theme; and
   based at least in part on the output score for the theme, select the theme from a plurality of candidate themes.

* * * * *